US008698697B2

(12) United States Patent
Fujii et al.

(10) Patent No.: US 8,698,697 B2
(45) Date of Patent: Apr. 15, 2014

(54) SEMICONDUCTOR DEVICE

(75) Inventors: Teruyuki Fujii, Kanagawa (JP); Kazuya Hanaoka, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 778 days.

(21) Appl. No.: 12/135,373

(22) Filed: Jun. 9, 2008

(65) Prior Publication Data

US 2008/0309581 A1 Dec. 18, 2008

(30) Foreign Application Priority Data

Jun. 12, 2007 (JP) ................................ 2007-154824

(51) Int. Cl.
*H01Q 1/36* (2006.01)
*G08B 13/14* (2006.01)
*G06K 19/077* (2006.01)

(52) U.S. Cl.
USPC ........................................ 343/895; 340/572.7

(58) Field of Classification Search
USPC ........... 343/873, 895, 700 MS; 257/678, 103, 257/728; 235/492; 340/572.7
See application file for complete search history.

(56) References Cited

U.S. PATENT DOCUMENTS

| | | | | |
|---|---|---|---|---|
| 5,788,854 | A | 8/1998 | Desaigoudar et al. | |
| 5,852,289 | A | 12/1998 | Masahiko | |
| 6,173,898 | B1 | 1/2001 | Mande | |
| 6,208,019 | B1 | 3/2001 | Tane et al. | |
| 6,362,523 | B1 | 3/2002 | Fukuda | |
| 6,412,702 | B1 | 7/2002 | Ishikawa et al. | |
| 6,486,853 | B2 * | 11/2002 | Yoshinomoto et al. | 343/895 |
| 6,525,410 | B1 * | 2/2003 | Gelsomini et al. | 257/678 |
| 6,563,202 | B1 | 5/2003 | Ohsawa et al. | |
| 6,910,636 | B2 | 6/2005 | Kim et al. | |
| 6,933,533 | B2 | 8/2005 | Yamazaki et al. | |
| 7,129,145 | B2 | 10/2006 | Kawamura et al. | |
| 7,271,076 | B2 | 9/2007 | Yamazaki et al. | |
| 7,358,180 | B2 | 4/2008 | Sakai et al. | |
| 7,436,032 | B2 * | 10/2008 | Kato | 257/390 |
| 7,465,596 | B2 * | 12/2008 | Tsurume et al. | 438/46 |

(Continued)

FOREIGN PATENT DOCUMENTS

| | | |
|---|---|---|
| JP | 58-050797 | 3/1983 |
| JP | 09-504909 | 5/1997 |

(Continued)

*Primary Examiner* — Michael C Wimer
(74) *Attorney, Agent, or Firm* — Fish & Richardson P.C.

(57) ABSTRACT

In a semiconductor device in which a copper plating layer is used for a conductor of an antenna and in which an integrated circuit and the antenna are formed over the same substrate, an object is to prevent an adverse effect on electrical characteristics of a circuit element due to diffusion of copper, as well as to provide a copper plating layer with favorable adhesiveness. Another object is to prevent a defect in the semiconductor device that stems from poor connection between the antenna and the integrated circuit, in the semiconductor device in which the integrated circuit and the antenna are formed over the same substrate. In the semiconductor device, a copper plating layer is used for the antenna, an alloy of Ag, Pd, and Cu is used for a seed layer thereof, and TiN or Ti is used for a barrier layer.

34 Claims, 9 Drawing Sheets

(56) References Cited

U.S. PATENT DOCUMENTS

| | | | | |
|---|---|---|---|---|
| 7,750,852 | B2 | 7/2010 | Hanaoka et al. | |
| 8,373,274 | B2 | 2/2013 | Sakai et al. | |
| 2003/0010980 | A1 * | 1/2003 | Yamazaki et al. | 257/65 |
| 2006/0009251 | A1 | 1/2006 | Noda et al. | |
| 2006/0262030 | A1 | 11/2006 | Bae et al. | |
| 2007/0020932 | A1 | 1/2007 | Maruyama et al. | |
| 2007/0085202 | A1 | 4/2007 | Shionoiri | |
| 2007/0215897 | A1 * | 9/2007 | Shen et al. | 257/103 |
| 2008/0245880 | A1 | 10/2008 | Yamazaki et al. | |
| 2009/0001501 | A1 * | 1/2009 | Fuyuki et al. | 257/506 |

FOREIGN PATENT DOCUMENTS

| | | | |
|---|---|---|---|
| JP | 2000-299339 | | 10/2000 |
| JP | 2001-284521 | | 10/2001 |
| JP | 2002-151829 | | 5/2002 |
| JP | 2002-324890 | | 11/2002 |
| JP | 2004-087597 | | 3/2004 |
| JP | 2004-200288 | | 7/2004 |
| JP | 2004-282487 | | 10/2004 |
| JP | 2005-252193 | A | 9/2005 |
| JP | 2006-024087 | A | 1/2006 |
| JP | 2007-027177 | A | 2/2007 |

* cited by examiner

SEMICONDUCTOR DEVICE

BACKGROUND OF THE INVENTION

1. Field of the Invention

The present invention relates to a semiconductor device capable of input and output of information by using electromagnetic waves. It is to be noted that the semiconductor device in this specification refers to all devices that can function by utilizing semiconductor characteristics, and electro-optic devices, semiconductor circuits, and electrical appliances, which have this function, are all semiconductor devices.

2. Description of the Related Art

In recent years, wireless chips for radio frequency identification system (RFID) have been researched and put into practical use as an information and communication technology utilizing electromagnetic waves.

RFID refers to a communication technology over electromagnetic waves between a reader/writer and a semiconductor device capable of wirelessly transmitting and receiving information (also called an RFID tag, an RF tag, an ID tag, an IC tag, a wireless tag, an electronic tag, a wireless chip, or an ID chip), so that data can be stored in or read out from the semiconductor device. Such a semiconductor device includes an antenna and an integrated circuit having a signal processing circuit provided with a memory circuit and the like.

A wireless chip used for RFID obtains an operating power by electromagnetic induction from electromagnetic waves that are received with a reader/writer, and exchanges data with the reader/writer by utilizing the electromagnetic waves. A wireless chip, in general, has an antenna which transmits and receives such electromagnetic waves and which is formed separately from an integrated circuit and connected to the integrated circuit.

In the case where an antenna and an integrated circuit are thus formed separately and connected to each other, they need to be electrically connected to each other, which leads to low yield because of technical difficulty in connection between the antenna and a minute terminal of the integrated circuit. Moreover, stress applied at a connection point in the use of a wireless chip causes disconnection or poor connection. In particular, when a wireless chip is flexible, it is expected that poor connection is more likely to occur.

In order to solve the aforementioned problem of poor connection between an antenna and an integrated circuit, a wireless chip having an antenna coil formed over the same substrate has been suggested. For example, in a suggested wireless chip having an integrated circuit and an antenna coil formed over the same substrate, a conductor of the antenna coil is formed of a metal sputtering layer or a metal evaporation layer and of a copper plating layer formed over the metal sputtering layer or the metal evaporation layer. The metal sputtering layer and the metal evaporation layer include one of aluminum, nickel, copper, or chromium, or include an alloy of at least two of these metals (for example, see Patent Document 1: Japanese Published Patent Application No. 2002-324890).

Accordingly, the conductor of the antenna coil has a stacked-layer structure of the metal sputtering layer or the metal evaporation layer, and the copper plating layer having lower electric resistance than the metal sputtering layer or the metal evaporation layer. Therefore, the loss of electromagnetic energy can be reduced as compared with a structure of only the metal sputtering layer or the metal evaporation layer, and communication distance to a reader/writer can be extended.

Further, an electronic device utilizing a plating layer of a metal such as copper as an inductor coil has been suggested (for example, see Patent Document 2: Japanese Translation of PCT International Application No. H9-504909). For a seed layer of the plating, TiW, Cu, Pd, Ti, Ni, Cr, Ag, Au, or NiFe; or an alloy thereof is used.

SUMMARY OF THE INVENTION

However, with the above conventional structure, it is possible that electrical characteristics of circuit elements such as a TFT and the like, which are included in an integrated circuit formed over the same substrate as an antenna coil, are adversely affected due to occurrence of diffusion of copper, such as electromigration or stress migration. Consequently, it is necessary to provide a base layer (barrier layer) to prevent the diffusion of copper.

Further, there is a problem that the copper plating layer peels off easily from a substrate, due to poor adhesion between the copper plating layer and the seed layer, or between the seed layer and the barrier layer.

In a semiconductor device in which a copper plating layer is used for a conductor of an antenna and in which an integrated circuit and the antenna are formed over the same substrate, an object of the present invention is to reduce peeling of the copper plating layer by improving adhesiveness of the copper plating layer that serves as an antenna, as well as to prevent an adverse effect on an electrical characteristic of a circuit element due to diffusion of copper. Another object is to prevent a defect in the semiconductor device that stems from poor connection between the antenna and the integrated circuit, in the semiconductor device in which the integrated circuit and the antenna are formed over the same substrate.

In order to solve the above problems, in the present invention, in a semiconductor device in which an antenna and an integrated circuit are formed over the same substrate, along with using a copper plating layer for the antenna, an alloy of silver (Ag), palladium (Pd), and copper (Cu) is used for a seed layer thereof and titanium nitride or titanium (Ti) is used for a barrier layer.

According to a semiconductor device of the present invention, in a semiconductor device in which a copper plating layer is used for a conductor of an antenna and in which an integrated circuit and the antenna are formed over the same substrate, diffusion of copper to a circuit element can be prevented and an adverse effect on an electrical characteristic of the circuit element due to the diffusion of copper can be reduced. Further, peeling of the copper plating layer can be reduced by improving adhesion between the copper plating layer and a seed layer or between the seed layer and a barrier layer.

DETAILED DESCRIPTION OF THE INVENTION

Embodiment Mode

Figure 1A:
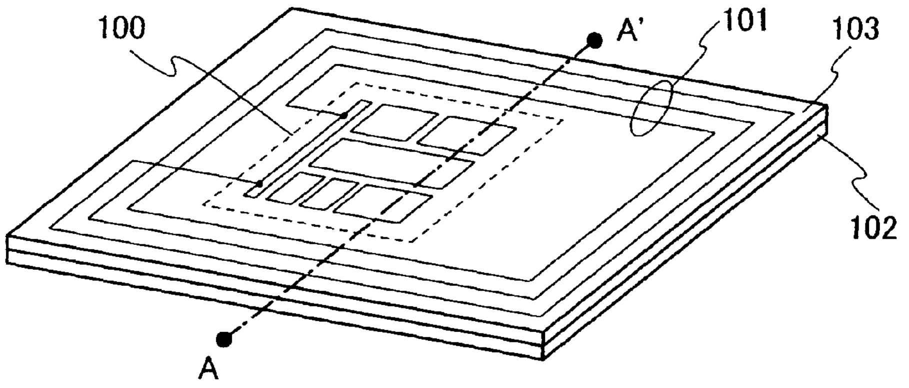
FIGS. 1A to 1C show a wireless chip according to Embodiment Mode 1 of the present invention.

Embodiment modes of the present invention will hereinafter be described with reference to the accompanying drawings. However, the present invention is not limited to the following description and it is easily understood by those skilled in the art that modes and details of the present invention can be modified in various ways without departing from the purpose and scope of the present invention. Therefore, the present invention should not be interpreted as being limited to the following description of embodiment modes. Note that in all the drawings for explaining embodiment modes, the same portions are denoted by the same reference numerals.

In this specification, an integrated circuit refers to an electronic circuit having various functions, which is manufactured in such a way that circuit elements such as a transistor, a resistor, a capacitor, and a diode are collectively designed over one substrate and simultaneously the elements are connected by wirings. For example, the integrated circuit includes a transmission circuit, a reception circuit, a power supply circuit, a memory circuit, and a logic control circuit in order to operate as a wireless chip. A substrate supporting the integrated circuit (IC chip) is not limited to a silicon substrate and may be a glass substrate or a flexible substrate such as a polyimide substrate.

Embodiment Mode 1

Figure 1B:
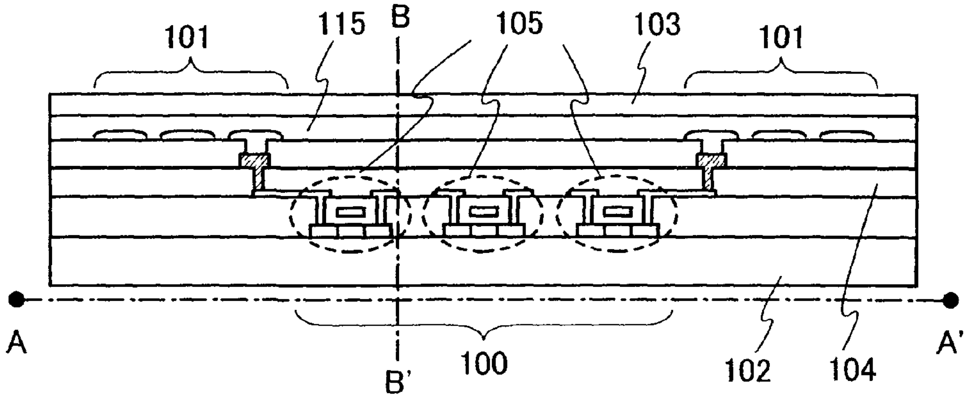
Figure 1C:
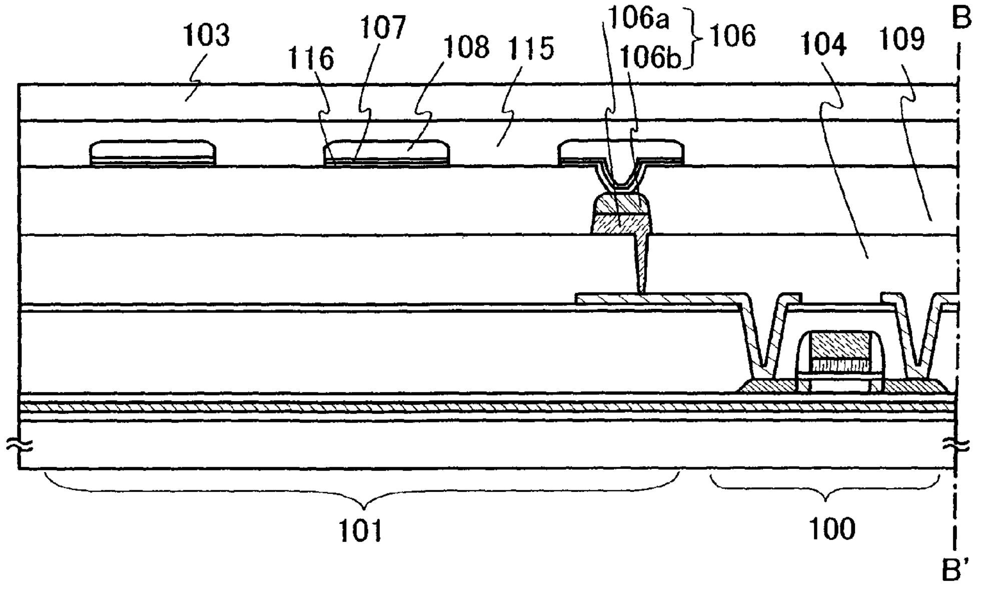

Embodiment Mode 1 of a semiconductor device of the present invention will hereinafter be described with reference to drawings. FIGS. 1A to 1C show a wireless chip as an example of a semiconductor device of the present invention. FIG. 1A is a perspective view of the wireless chip, FIG. 1B is a cross sectional view thereof along A-A' of FIG. 1A, and FIG. 1C is a magnified view of a left part from a chain line B-B' of FIG. 1B.

In FIG. 1A, an integrated circuit 100 and an antenna 101 are formed over one substrate 102 and covered by a cover member 103. A planar shape of the antenna 101 has a rectangular and spiral shape, and the antenna 101 is electrically connected to the integrated circuit 100.

In FIG. 1B, the integrated circuit 100 is formed over the substrate 102 and the antenna 101 is formed over a third interlayer insulating film 104 that covers the integrated circuit 100. A protection film 115 and the cover member 103 are formed over the antenna 101.

Although a thin film transistor (TFT) 105 is shown as an example of a semiconductor element in the integrated circuit 100, the semiconductor element used in the integrated circuit 100 is not limited to the TFT. For example, a storage element, a diode, a photoelectric conversion element, a resistor, a coil, a capacitor, an inductor, or the like is used instead of the TFT.

In FIG. 1C, the antenna 101 includes a lower wiring 106, a barrier layer 116 formed over the lower wiring 106, a seed layer 107 formed over the barrier layer 116, and a copper plating layer 108 formed over the seed layer 107. The barrier layer 116 is made of titanium nitride or Ti, and the seed layer 107 is made of an alloy of Ag, Pd, and Cu. As an example, the lower wiring 106 has a stacked-layer structure of an Al film 106*a* and a Ti film 106*b*, and is electrically connected to the integrated circuit 100 through a contact hole that is formed in the third interlayer insulating film 104.

An insulating layer 109 is formed between elements of the antenna 101, and the protection film 115 and the cover member 103 are formed over the antenna 101 and the insulating layer 109.

By using an alloy of Ag, Pd, and Cu for the seed layer 107 in this embodiment mode, the seed layer 107 has high sulfidation resistance while maintaining low resistance of Ag, has little residue during dry etching, and has strong adhesion to the copper plating layer. Further, by using titanium nitride or Ti for the barrier layer 116, a copper plating layer with excellent adhesion to the alloy of Ag, Pd, and Cu that does not peel off easily, which also prevents diffusion of copper, can be formed.

It is preferable to form an inorganic insulating film with a high barrier property, such as silicon nitride oxide or silicon nitride, between the protection film 115 and the copper plating layer 108, because copper diffusion from above can also be prevented.

The cover member 103 can be formed of a dielectric material such as plastic, an organic resin, paper, fiber, prepreg, or a ceramic sheet, which is to be attached with an adhesive. Although an example is shown here in which the wireless chip has mechanical strength increased by the cover member 103 being attached with an adhesive, it is not always necessary that the cover member 103 of the wireless chip of the present invention be attached with an adhesive. For example, instead of attaching the cover member 103 with an adhesive, the integrated circuit 100 and the antenna 101 may be covered directly with a resin or the like to increase the mechanical strength of the wireless chip. Alternatively, the mechanical strength of the wireless chip may be increased by controlling the thickness of the insulating layer 109.

Next, a method of manufacturing a semiconductor device of this embodiment mode will be explained. FIGS. 2A to 3C show steps of manufacturing an antenna portion of the wireless chip illustrated in FIG. 1C.

Figure 2A:
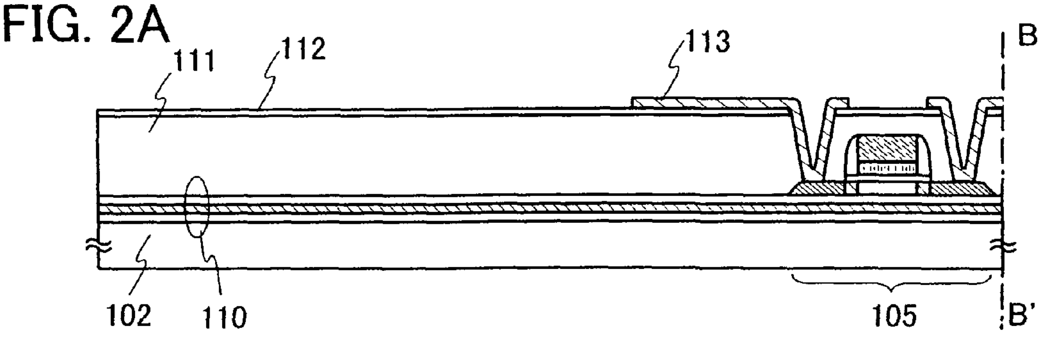
FIGS. 2A to 2D show a manufacturing process of a wireless chip according to Embodiment Mode 1 of the present invention.

As shown in FIG. 2A, an integrated circuit is formed over the substrate 102 made of glass or the like in accordance with a general process. Here, the thin film transistor (TFT) 105 is shown as an example of the integrated circuit.

First, a base film 110 is formed over the substrate 102, and the TFT 105 is formed over the base film 110 in accordance with a general process. Then, a first interlayer insulating film 111 and a second interlayer insulating film 112 are formed in this order over the TFT 105. Contact holes are formed next by a general method in the first interlayer insulating film 111 and the second interlayer insulating film 112 at portions thereof to be provided with electrodes, such as a source region and a drain region of the TFT 105. Then, an electrode 113 is formed.

The base film 110 is provided in order to prevent alkaline-earth metal or alkali metal such as Na in the substrate 102 from diffusing into the semiconductor film, thereby preventing an adverse effect on characteristics of the semiconductor elements such as the TFT. The base film 110 either may be a single insulating film or stacked insulating films. For example, an insulating film which can prevent alkali metal and alkaline-earth metal from diffusing into the semiconductor film, such as a silicon oxide film, a silicon nitride film, a silicon oxynitride film, or a silicon nitride oxide film is used.

In this embodiment mode, a 100-nm-thick silicon oxynitride film, a 50-nm-thick silicon nitride oxide film, and a 100-nm-thick silicon oxynitride film are stacked in this order to form the base film 110; however, the material, thickness, and number of films are not limited to these. For example, even in the aforementioned case of the three-layer structure, the silicon oxynitride film as the lower layer may be replaced by a siloxane-based resin film with a thickness of 0.5 to 3 μm inclusive which is formed by a spin coating method, a slit coating method, a droplet discharging method, a printing method, or the like. The silicon nitride oxide film as the middle layer may be replaced by a silicon nitride (such as $Si_3N_4$) film. The silicon oxynitride film as the upper layer may be replaced by a silicon oxide film. The thickness of each film is preferably in the range of 0.05 to 3 μm inclusive, and can be freely selected from that range.

Note that here, a silicon oxynitride film is that in which a contained amount of oxygen is more that that of nitrogen in terms of composition, and when measured using Rutherford backscattering spectrometry (RBS) and hydrogen forward scattering (HFS), a concentration range is as follows: 50 to 70 atomic % of hydrogen, 0.5 to 15 atomic % of nitrogen, 25 to 35 atomic % of Si, and 0.1 to 10 atomic % of hydrogen. Further, a silicon nitride oxide film is that in which a contained amount of nitrogen is more than that of oxygen in terms of composition, and when measured using RBS and HFS, a concentration range is as follows: 5 to 30 atomic % of oxygen, 20 to 55 atomic % of nitrogen, 25 to 35 atomic % of Si, and 10 to 30 atomic % of hydrogen. Note that when the total number of atoms that form the silicon oxynitride or the silicon nitride oxide is 100 atomic %, a content ratio of nitrogen, oxygen, Si, and hydrogen is to be within the above range.

Figure 2B:
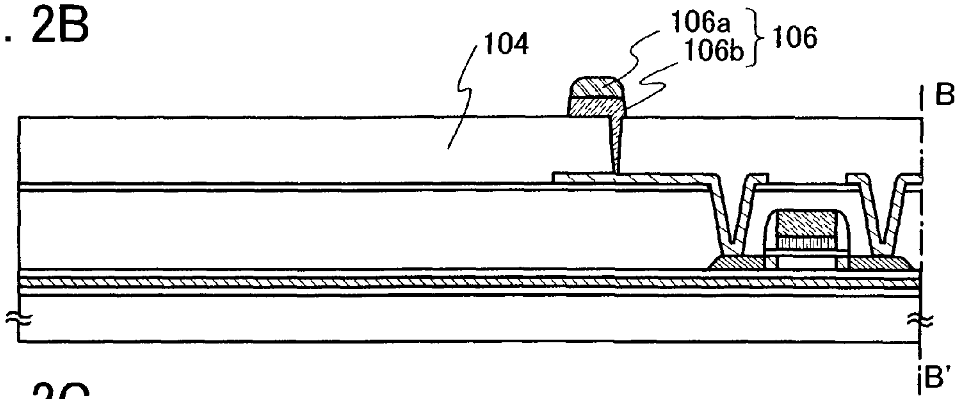

Subsequently, as shown in FIG. 2B, the third interlayer insulating film 104 is formed over the second interlayer insulating film 112 and the electrode 113. Then, a contact hole is formed over the electrode 113. Next, the lower wiring 106 serving as a part of the antenna is formed over the third interlayer insulating film 104. Here is shown an example of the lower wiring 106, in which the Al film 106*a* with high conductivity and the Ti film 106*b* for preventing generation of hillock and void of the Al film 106*a* are stacked. The lower wiring 106 is electrically connected to the electrode 113 through the contact hole in the third interlayer insulating film 104.

Figure 2C:
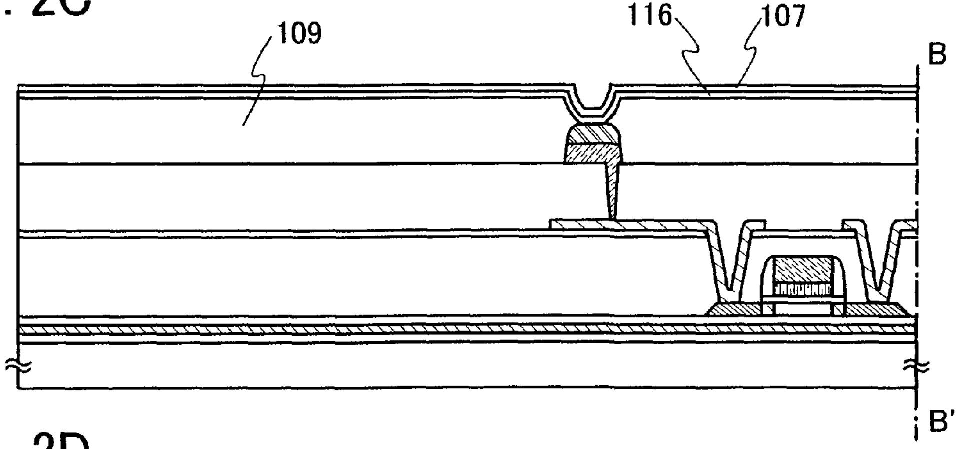

Next, as shown in FIG. 2C, after forming the insulating layer 109 over the third interlayer insulating film 104 and the lower wiring 106, desired portions of the insulating layer 109 that are over the lower wiring 106 are removed by patterning by photolithography, to expose the lower wiring 106, so that an open portion is formed. Then, the barrier layer 116 and the seed layer 107 are formed over the exposed portions of the lower wiring 106 and the insulating layer 109 by a sputtering method. As the barrier layer 116, titanium nitride or Ti is formed with a thickness of 100 nm for example, and as the seed layer 107, an alloy of Ag, Pd, and Cu is formed with a thickness of 100 nm for example. For the seed layer 107, an alloy of Ag, Pd, and Cu is used as a target. Further, plural kinds of metals forming an alloy may be used as a target. For example, the target may be a metal plate of Ag in which a plurality of small metal plates of Pd or Cr are embedded. Note that the barrier layer 116 is formed as a titanium nitride film by performing reactive sputtering in a nitrogen gas atmosphere using titanium as a target. When performing reactive sputtering, the barrier layer 116 is completely nitrided if the amount of nitrogen is sufficient, and if the amount of nitrogen gas is small, a portion of the barrier layer 116 is nitrided.

Figure 2D:
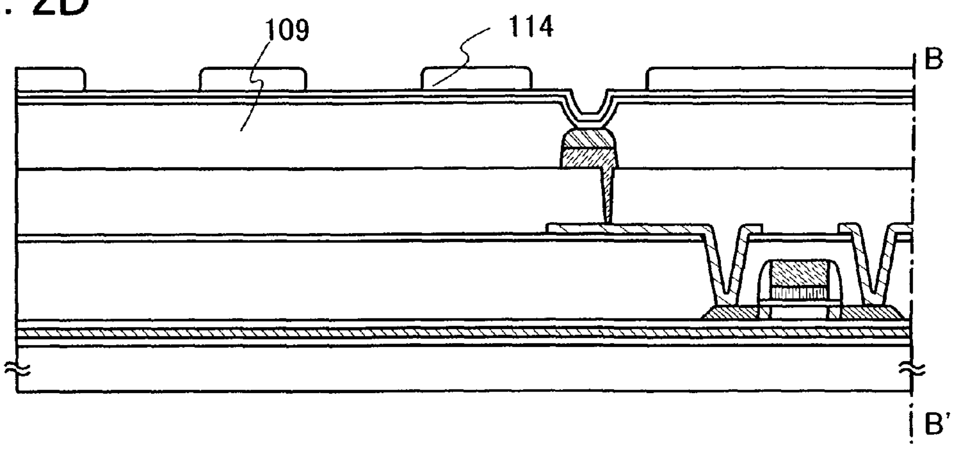

Next, as shown in FIG. 2D, after forming a photoresist 114 thereover, pattering is performed by photolithography to remove the photoresist 114 in the open portion over the lower wiring 106 in a periphery of the open portion and a portion that the antenna 101 is formed, so that the seed layer 107, which covers the open portion and the periphery of the open portion, and in which the antenna 101 is formed, is exposed.

Figure 3A:
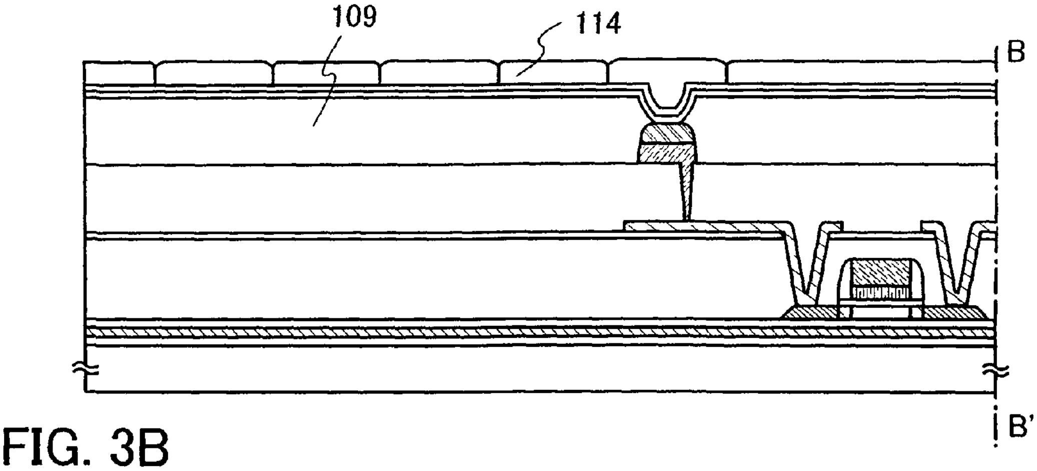
FIGS. 3A to 3C show a manufacturing process of a wireless chip according to Embodiment Mode 1 of the present invention.
Figure 3B:
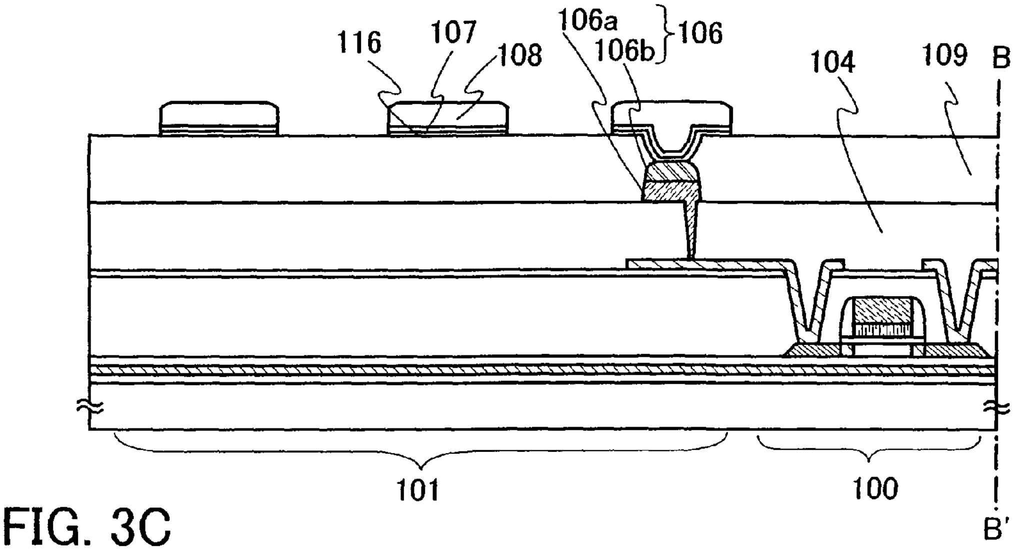

As shown in FIG. 3A, the copper plating layer 108 is formed by an electrolytic plating method with a thickness of, for example, 2 μm, over the exposed seed layer 107 which covers the open portion and the periphery of the open portion, and in which the antenna 101 is formed. Thereafter, as shown in FIG. 3B, the photoresist 114 is removed, and unnecessary portions of the barrier layer 116 and the seed layer 107, which are portions other than those under the copper plating layer 108, are removed. For example, when the barrier layer 116 is made of titanium nitride, etching can be performed using a mixed solution of hydrogen peroxide water and ammonia, or diluted hydrofluoric acid (about 1%). When the seed layer 107 is made of an alloy of Ag, Pd, and Cu, etching can be performed using a mixed solution of nitric acid, phosphoric acid, and acetic acid, or diluted nitric acid.

Figure 3C:
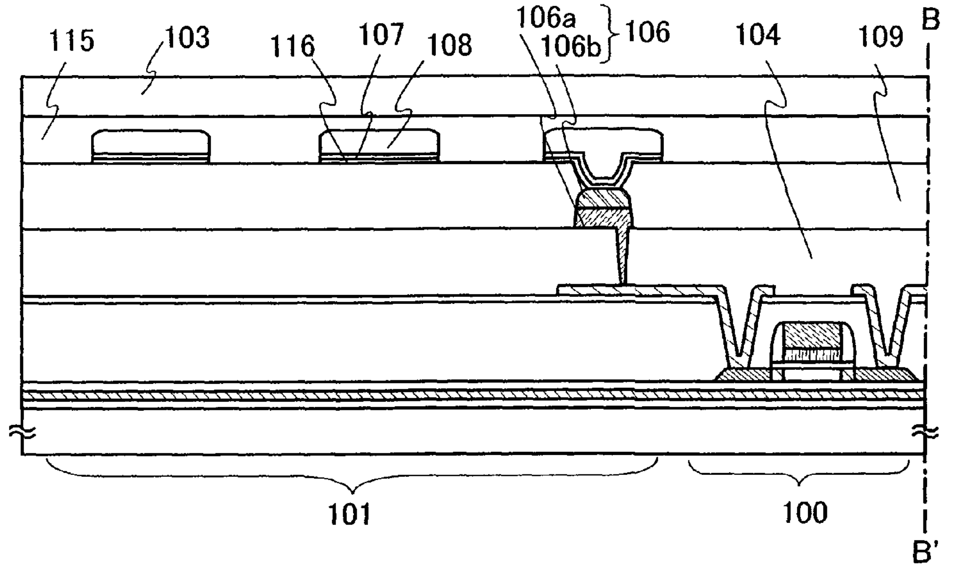

Lastly, as shown in FIG. 3C, the protection film 115 is formed over the copper plating layer 108 and the insulating layer 109, and the cover member 103 is formed with an adhesive thereover.

The first interlayer insulating film 111 can be formed of a heat-resistant organic resin such as polyimide, acrylic, or polyamide. Instead of the aforementioned organic resins, a low dielectric constant material (low-k material), a resin including a Si—O—Si bond (hereinafter also called a siloxane-based resin), or the like can also be used. Siloxane has a skeleton structure of a bond of silicon (Si) and oxygen (O). As a substituent, an organic group containing at least hydrogen (such as an alkyl group or aromatic hydrocarbon) is used. Alternatively, a fluoro group may be used as the substituent. Further alternatively, a fluoro group and an organic group containing at least hydrogen may be used as the substituent. The first interlayer insulating film 111 can be formed by spin coating, dipping, spray coating, a droplet discharging method (an ink jetting method, screen printing, offset printing, or the like), a doctor knife, a roll coater, a curtain coater, a knife coater, or the like, depending on the material thereof. Alternatively, the first interlayer insulating film 111 can be formed using an inorganic material such as silicon oxide, silicon nitride, silicon oxynitride, PSG (phosphosilicate glass), PBSG (phosphoborosilicate glass), BPSG (borophosphosilicate glass), or an alumina film. Insulating films of these may be stacked to form the first interlayer insulating film 111.

The second interlayer insulating film 112 may be a film including carbon such as DLC (diamond-like carbon) or carbon nitride (CN), a silicon oxide film, a silicon nitride film, a silicon nitride oxide film, or the like formed by a plasma CVD method, atmospheric pressure plasma, or the like. Alternatively, a photosensitive or non-photosensitive organic material such as polyimide, acrylic, polyamide, or benzocyclobutene; resist; a siloxane-based resin; or the like may be used.

A filler may be mixed into the first interlayer insulating film 111 or the second interlayer insulating film 112 in order to prevent the first interlayer insulating film 111 or the second interlayer insulating film 112 from being peeled off or cracked due to stress generated by a difference in coefficient of thermal expansion between the first interlayer insulating film 111 or the second interlayer insulating film 112 and a conductive material of a wiring that is formed later, or the like.

The third interlayer insulating film 104 can be formed using an organic resin film, an inorganic insulating film, or a siloxane-based insulating film. The organic resin film may include, for example, acrylic, polyimide, polyamide, or the like, and the inorganic insulating film may include silicon oxide, silicon nitride oxide, or the like. A mask used for forming the contact hole can be formed by a droplet discharging method or a printing method. Moreover, the third interlayer insulating film 104 itself can be formed by a droplet discharging method or a printing method.

Note that although as the lower wiring 106, an example of a stacked-layer structure of the Al film **106*a* with favorable electrical conductivity and the Ti film 106*b* which prevents hillock and void of the Al film 106*a* is shown, a titanium nitride film may be formed under the Al film 106*a* for preventing diffusion of Al. It is preferable that the Al film 106*a*** is formed of pure Al of more that or equal to 99.9% purity with a thickness of 400 to 500 nm.

Note that the lower wiring 106 is not always necessary. Of course, in the same way as in the case of providing the lower wiring 106, the antenna 101 includes the barrier layer 116, the seed layer 107, and the copper plating layer 108 in the case of not forming the lower wiring 106.

An organic resin such as polyimide, epoxy, acrylic, or polyamide can be used for the insulating layer 109. Instead of the aforementioned organic resins, an inorganic resin such as a resin including a Si—O—Si bond formed by using a siloxane-based material (this resin is hereinafter referred to as a siloxane-based resin) as a starting material can be used. The siloxane-based resin may include as a substituent at least one of fluorine, an alkyl group, or aromatic hydrocarbon in addition to hydrogen.

If a soft magnetic material can be contained, an inorganic insulating film such as a film of silicon oxide, silicon nitride oxide, silicon nitride, or the like can also be used as the insulating layer 109.

The protection film 115 can be formed by, for example, applying on the entire surface an epoxy-based, acrylate-based, or silicon-based resin which is soluble in water or in alcohols by a spin coating method or the like.

Although this embodiment mode shows the example of forming the copper plating layer 108 by an electrolytic plating method, an electroless plating method may alternatively be employed. The planar shape of the antenna may have a shape other than the rectangular and spiral shape.

Although the example is described in which the substrate 102 is a glass substrate in this example, the substrate 102 may be a flexible substrate such as a plastic substrate. In the case of using a flexible substrate, the antenna and the integrated circuit are first formed over a substrate made of glass or the like; then, attached to the flexible substrate.

Here, a reason for using titanium nitride or Ti for the barrier layer 116 and using an alloy of Ag, Pd, and Cu for the seed layer 107 in this embodiment mode is described based on the following experimental result. The inventors performed an experiment of forming copper electrolytic plating, using plural kinds of metals as the barrier layer 116 and the seed layer 107. A result thereof is shown in Table 1 below. Note that samples No. 17 and 18 are of the structure in this embodiment mode, and samples No. 1 to 16 are comparative examples. Further, in Table 1, formation of Cu plating is described as follows: a circle means that Cu plating is favorably formed, a triangle means that abnormal Cu plating is formed, and an x-mark means that Cu plating is not formed. Also, in an adhesiveness test, a circle means that adhesion between the seed layer and the barrier layer is favorable, a triangle means that adhesion between the seed layer and the substrate or the barrier layer is not favorable, and an x-mark means that adhesion between the seed layer and the Cu plating is not favorable.

TABLE 1

| No. | barrier layer | seed layer | Cu plating layer | adhesion |
|---|---|---|---|---|
| 1 | non | Ti | x | — |
| 2 | non | Ta | x | — |
| 3 | non | titanium nitride | x | — |
| 4 | non | tantalum nitride | x | — |
| 5 | non | Al | x | — |
| 6 | non | Cr | Δ | x |
| 7 | non | W | ○ | x |
| 8 | non | Mo | ○ | x |
| 9 | non | Ni | ○ | Δ |
| 10 | non | APC | ○ | Δ |
| 11 | Al | APC | ○ | Δ |
| 12 | Ta | APC | ○ | Δ |
| 13 | W | APC | ○ | Δ |
| 14 | Ni | APC | ○ | Δ |
| 15 | Mo | APC | ○ | Δ |
| 16 | tantalum nitride | APC | ○ | Δ |
| 17 | Ti | APC | ○ | ○ |
| 18 | titanium nitride | APC | ○ | ○ |

The experiment was carried out using glass for a substrate (alkali-free glass, AN100, manufactured by Asahi Glass Co., Ltd.). Eighteen samples each with a different combination of a 100-nm-thick barrier layer and a 100-nm-thick seed layer as shown in Table 1 were manufactured, and each sample was subjected to copper electrolytic plating at room temperature. As shown in Table 1, samples without a barrier layer were also manufactured. The electrolytic plating was performed for several minutes at a current density of 1 to 2 A/dm$^2$, using MICROFAB Cu300 (manufactured by Electroplating Engineers of Japan Ltd.) as a plating solution and high phosphorus copper as an anode electrode, so that a film thickness was about 2 μm.

As a result, as shown in Table 1, for samples which used Ti, Ta, titanium nitride, tantalum nitride, and Al for seed layers and did not use barrier layers (No. 1 to 5 in Table 1), a copper plating layer could not be formed. For a sample which used Cr for the seed layer and did not use a barrier layer (No. 6 in Table 1), a copper plating layer was obtained, but copper was powdery and did not have luster, and in the adhesiveness test, adhesion between the seed layer and the copper plating layer was not favorable. Note that the adhesiveness test was performed by pressing kapton tape onto the copper plating layer and then peeling off the tape, and observing whether the copper plating layer remained on the substrate.

For samples which used W and Mo for seed layers and did not use barrier layers (No. 7 and 8 in Table 1), although copper plating layers with luster were formed, adhesion between the seed layer and the copper plating layer was not favorable. For samples using Ni and APC for seed layers and did not use barrier layers (No. 9 and 10 in Table 1), although copper plating layers with luster were formed and adhesion between the seed layer and the copper plating layer was favorable, adhesion between the seed layer and the substrate was not favorable. Note that APC refers to an alloy of Ag, Pd, and Cu manufactured by Furuya Metal Co., Ltd., and a composition thereof is as follows: about 98 weight % of Ag, about 1 weight % of Pd, and about 1 weight % of Cu.

From the above results, it was found that when APC is used for the seed layer, a copper plating layer with favorable adhesion between the seed layer and the copper plating layer can be formed.

Next, when APC was used for the seed layer and Al, Ta, W, Ni, Mo, and tantalum nitride were used for the barrier layers (No. 11 to 16 in Table 1), although copper plating layers with luster were formed and adhesion between the seed layer and the copper plating layer was favorable, adhesion between the seed layer and the barrier layer was not favorable. When APC was used for the seed layer and Ti and titanium nitride were used for the barrier layers (No. 17 and 18 in Table 1), copper plating layers with luster were formed, adhesion between the seed layer and the copper plating layer was favorable, and adhesion between the seed layer and the barrier layer was also favorable.

From the above results, it was found that when Ti or titanium nitride is used for barrier layers and an alloy of Ag, Pd, and Cu is used for a seed layer over the barrier layer, a copper plating layer with favorable adhesion can be formed. Note that the same applies to an alloy containing more than or equal to 90 weight % of Ag and about 5 weight % of each of Pd and Cu. Note that since Ti and titanium nitride has an effect of preventing diffusion of copper, they each have a function of a barrier layer.

Embodiment Mode 2

Figure 4:
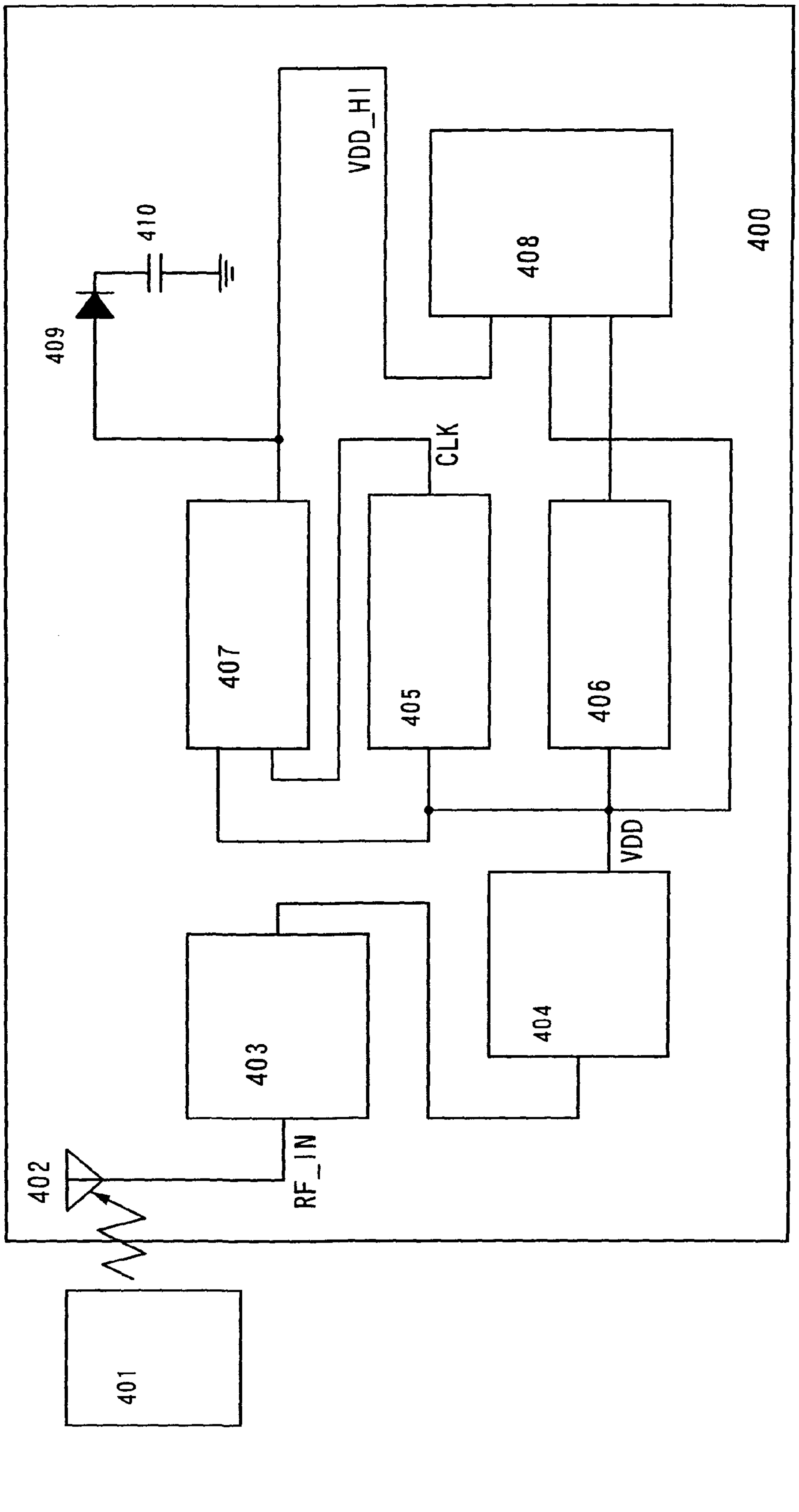
FIG. 4 is a block diagram of a wireless chip according to Embodiment Mode 2 of the present invention.

Next, an example of a circuit configuration of the wireless chip described in Embodiment Mode 1 is shown. FIG. 4 is a block diagram for illustrating circuits of the wireless chip.

FIG. 4 shows an example of a block diagram of a circuit arrangement of the wireless chip of the present invention. In FIG. 4, a reader/writer 401 is a device for writing and reading data in and from a wireless chip 400 from outside without contact. The wireless chip 400 includes an antenna portion 402 for receiving electromagnetic waves; a rectifier circuit 403 for rectifying the output of the antenna portion 402; a regulator circuit 404 for outputting operating voltage VDD to each circuit upon the receipt of the output from the rectifier circuit 403; a clock generator circuit 405 for generating clock upon the receipt of the output from the regulator circuit 404; a booster circuit 407 for supplying data-writing voltage to a memory circuit 408 that carries out data writing or reading, upon the receipt of the output from a logic circuit 406; a backflow prevention diode 409 to which the output of the booster circuit 407 is to be inputted; a battery capacitor 410 in which the output of the backflow prevention diode 409 is to be inputted to accumulate charges; and the logic circuit 406 for controlling a circuit such as the memory circuit 408.

Although not particularly shown here, there may additionally be a data modulator/demodulator circuit, a sensor, an interface circuit, and the like. With such a structure, the wireless chip 400 can communicate information with the reader/writer 401 without contact.

Among components in the above structure included in a wireless chip, those other than the antenna portion 402 can be formed as an integrated circuit, and the antenna and the integrated circuit can be formed over the same substrate.

Although this embodiment mode explains the example of the wireless chip provided with the battery capacitor 410 as a wirelessly chargeable battery (radio frequency battery, or noncontact battery by radio frequency), the battery capacitor 410 is not always necessary. When the battery capacitor 410 is not provided, the backflow prevention diode 409 is also unnecessary.

Moreover, the capacitor is used as a charging element for accumulating charges (also called battery); however, the present invention is not limited to this. In this embodiment mode, the battery refers to a wirelessly chargeable battery of which continuous operation time can recover by being charged. Further, as the battery, a thin sheet-like battery or a roll-like battery with a small diameter is preferably used, although the type of battery used may differ depending on the intended use. For example, size reduction is possible with a lithium battery, preferably a lithium polymer battery using gel electrolyte, a lithium ion battery, or the like. The battery may be any kind of chargeable battery, such as a nickel metal hydride battery, a nickel cadmium battery, an organic radical battery, a lead-acid battery, an air secondary battery, a nickel-zinc battery, a silver-zinc battery, or a capacitor with high capacity.

Note that as the capacitor with high capacity that can be used as a battery of this embodiment mode, it is preferable to use a capacitor having electrodes whose opposed areas are large. In particular, it is preferable to use a double-layer electrolytic capacitor which is formed using an electrode material having a large specific surface area, such as activated carbon, fullerene, or a carbon nanotube. A capacitor has a simpler structure than a battery, and further, a capacitor can be easily formed to be thin and formed by stacking layers. A double-layer electrolytic capacitor has a function of storing power and will not deteriorate that much even after it is charged and discharged a number of times. Further, a double-layer electrolytic capacitor has an excellent property that it can be charged rapidly.

In the present invention, the antenna is disposed in the center of the wireless chip, which improves the capability of the power source produced in the wireless chip and therefore enhances the charging efficiency.

In this embodiment mode, the antenna portion, the rectifier circuit portion, and the booster circuit used in the wireless chip are also used as the antenna portion, the rectifier circuit portion, and the booster circuit portion in the wirelessly chargeable battery; therefore, the reader/writer 401 can be used as a signal generating source for charging the battery capacitor 410 at the same time as operating the wireless chip.

The wirelessly chargeable battery shown in this embodiment mode can charge an object without contact, and is very easy to be carried. When the battery is provided in the wireless chip, a memory which needs a power source, such as SRAM, can be mounted, which can contribute to sophistication of the wireless chip.

However, the present invention is not limited to this structure, and a part or all of the antenna portion, the rectifier circuit portion, and the booster circuit may be separated for RFID operation and for charge of the wirelessly chargeable battery. For example, when the antenna portion 402 is separated for the antenna portion for RFID operation and the antenna portion for charge of the wirelessly chargeable battery, the frequency of signals used for RFID operation and the frequency of signals for charge of the wirelessly chargeable battery can be different from each other. In this case, the signals generated from the reader/writer 401 and the signals generated from the signal generating source to the wirelessly chargeable battery are preferably in the frequency range where the both signals do not interfere with each other.

When the antenna portion, the rectifier circuit portion, and the booster circuit are used in common for RFID operation and for charge of the wirelessly chargeable battery, the structure may be that a switching element is disposed between the wirelessly chargeable battery and the booster circuit and the booster circuit and the wirelessly chargeable battery are disconnected from each other by turning off the switch during writing operation while they are connected to each other by turning on the switch during the time other than the writing operation. In this case, since the battery is not charged during the writing operation, voltage drop during the writing operation can be avoided. The switching element can have a known structure.

Embodiment Mode 3

Next, a method of manufacturing a wireless chip of another embodiment mode of the present invention will be explained in detail. Although this embodiment mode shows a TFT as an example of a semiconductor element used for an integrated circuit of a wireless chip, a semiconductor element used for an integrated circuit is not limited to this, and any kind of semiconductor element can be used.

Figure 5A:
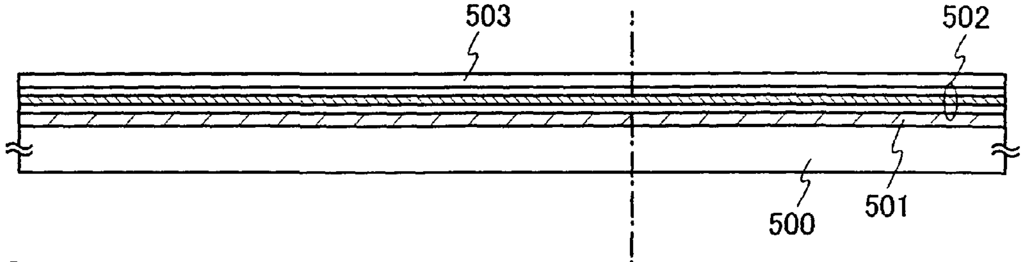
FIGS. 5A to 5E show a manufacturing method of a wireless chip according to Embodiment Mode 3 of the present invention.

First, a release layer 501 is formed over a heat-resistant first substrate 500 as shown in FIG. 5A. The first substrate 500 may be, for example, a glass substrate such as a barium borosilicate glass substrate or an aluminoborosilicate glass substrate, a quartz substrate, a ceramic substrate, or the like. Moreover, the first substrate 500 may be a semiconductor substrate or a metal substrate including a stainless steel substrate. A substrate formed of a synthetic resin having flexibility, such as plastic, generally tends to have lower allowable temperature limit than the above-described substrates; however, the substrate can be used as long as it can withstand a processing temperature in manufacturing steps.

The release layer 501 can be formed by a sputtering method, a reduced-pressure CVD method, a plasma CVD method, or the like by using a layer containing silicon such as amorphous silicon, polycrystalline silicon, single-crystal silicon, or microcrystalline silicon (including semi-amorphous silicon) as its main component. In this embodiment mode, the release layer 501 is formed of amorphous silicon with a thickness of about 50 nm by a reduced-pressure CVD method. The material of the release layer 501 is not limited to silicon and may be of any kind as long as it can be selectively etched away. The thickness of the release layer 501 is preferable in the range of from 10 to 100 nm. When semi-amorphous silicon is used, the thickness may be in the range of from 30 to 50 nm.

Next, a base film 502 is formed over the release layer 501. The base film 502 is provided in order to prevent alkaline-earth metal or alkali metal such as Na in the first substrate 500 from diffusing into the semiconductor film, thereby preventing an adverse effect on characteristics of the semiconductor element such as a TFT. The base film 502 also works to protect the semiconductor element during a later step of separating the semiconductor elements. The base film 502 either may be a single insulating film or stacked insulating films. Therefore, an insulating film which can prevent alkali metal and alkaline-earth metal from diffusing into the semiconductor film, such as a silicon oxide film, a silicon nitride film, or a silicon nitride oxide film is used.

In this embodiment mode, a 100-nm-thick silicon oxynitride film, a 50-nm-thick silicon nitride oxide film, and a 100-nm-thick silicon oxynitride film are stacked in this order to form the base film 502; however, the material, thickness, and number of stacked films are not limited to these. For example, the silicon oxynitride film as the lower layer may be replaced by a siloxane-based resin film with a thickness of 0.5 to 3 μm which is formed by a spin coating method, a slit coating method, a droplet discharging method, a printing method, or the like. The silicon nitride oxide film as the middle layer may be replaced by a silicon nitride (such as $Si_3N_4$) film. The silicon oxynitride film as the upper layer may be replaced by a silicon oxide film. The thickness of each film is preferably in the range of from 0.05 to 3 μm, and can be freely selected from that range.

Alternatively, the base film 502 may be formed by stacking a silicon oxynitride film or a silicon oxide film, a siloxane-based resin film, and a silicon oxide film in this order.

Here, the silicon oxide film can be formed by thermal CVD, plasma CVD, normal pressure CVD, bias ECRCVD, or the like with the use of a mixed gas of $SiH_4$ and $O_2$, a mixed gas of TEOS (tetraethoxysilane) and $O_2$, or the like. The silicon nitride film can be formed typically by plasma CVD with the use of a mixed gas of $SiH_4$ and $NH_3$. The silicon oxynitride film and the silicon nitride oxide film can be formed typically by plasma CVD with the use of a mixed gas of $SiH_4$ and $N_2O$.

Next, a semiconductor film 503 is formed over the base film 502. It is preferable that the semiconductor film 503 be formed without being exposed to the air after the formation of the base film 502. The semiconductor film 503 has a thickness of 20 to 200 nm (preferably 40 to 170 nm, more preferably 50 to 150 nm). The semiconductor film 503 may be formed of an amorphous semiconductor, a semi-amorphous semiconductor, or a polycrystalline semiconductor. Instead of silicon, silicon germanium may be used as the semiconductor. In the case of using silicon germanium, the concentration of germanium is preferably in the range of from about 0.01 to 4.5 atomic %.

The semiconductor film 503 may be crystallized by a known technique. Known crystallization methods include a laser crystallization method using laser light and a crystallization method using a catalytic element. Alternatively, a laser crystallization method using laser light and a crystallization method using a catalytic element may be used in combination. When the first substrate 500 is a heat-resistant substrate such as a quartz substrate, high-temperature annealing at about 950° C. may be combined with any of a thermal crystallization method using an electrically heated oven, a lamp annealing crystallization method using infrared light, or a crystallization method using a catalytic element.

For example, in the case of carrying out laser crystallization, the semiconductor film 503 is subjected to thermal annealing at 500° C. for an hour before laser crystallization. This thermal annealing can increase the resistance of the semiconductor film 503 against laser. Then, a continuous wave solid-state laser is used to irradiate the semiconductor film 503 with laser light of any of second to fourth harmonic waves of a fundamental wave; thus, crystals with large grain diameter can be obtained. For example, typically, a second harmonic (532 nm) or a third harmonic (355 nm) of a Nd:$YVO_4$ laser (fundamental wave: 1064 nm) is preferably used. Specifically, laser light emitted from a continuous wave $YVO_4$ laser is converted into a harmonic wave through a non-linear optical element, and thus laser light with a power of 10 W is obtained. Then, the laser light is preferably shaped into rectangular or elliptical laser light on an irradiated surface through an optical system, and is delivered onto the semiconductor film 503. The power density of the laser light at this time is necessary to range from about 0.01 to 100 $MW/cm^2$ (preferably 0.1 to 10 $MW/cm^2$). The irradiation is then performed by setting the scan speed in the range of from about 10 to 2000 cm/sec.

Alternatively, the laser crystallization may be performed by using a pulsed laser with a repetition rate of 10 MHz or more, which is very much higher than generally used lasers having a repetition rate of several tens to several hundreds of hertz. It is said that it takes several tens to several hundreds of nanoseconds to completely solidify a semiconductor film after the semiconductor film is irradiated with pulsed laser light. When the pulsed laser light has the above-described repetition rate, the semiconductor film can be irradiated with laser light before the semiconductor film melted by previous laser light is solidified. Therefore, a solid-liquid interface can be continuously moved in the semiconductor film so that crystal grains which have continuously grown in a scanning direction are formed in the semiconductor film. Specifically, it is possible to form an aggregation of crystal grains each having a width of approximately 10 to 30 μm in the scanning direction and a width of approximately 1 to 5 μm in a direction perpendicular to the scanning direction. It is also possible to form a semiconductor film having almost no crystal grain boundaries at least in a channel direction of the TFT by forming a crystal grain of a single crystal that is extended long along the scanning direction.

The laser crystallization may be performed by simultaneously delivering continuous wave laser light of a fundamental wave and continuous wave laser light of a harmonic wave, or simultaneously delivering continuous wave laser light of a fundamental wave and pulsed laser light of a harmonic wave.

The laser light may be delivered in an inert gas atmosphere such as noble gas or nitrogen. This can suppress the roughness of a semiconductor surface due to the laser irradiation and also suppress variation in threshold voltage caused by variation in interface state density.

By the aforementioned laser irradiation, the semiconductor film 503 with improved crystallinity is formed. Alternatively, a polycrystalline semiconductor may be formed in advance by a sputtering method, a plasma CVD method, a thermal CVD method, or the like.

Although the semiconductor film 503 is crystallized in this embodiment mode, the semiconductor film 503 may remain amorphous or microcrystalline without being crystallized and may be subjected to a later-described process. A TFT using an amorphous semiconductor or a microcrystalline semiconductor has advantages of low cost and high yield because the number of manufacturing steps is smaller than that of a TFT using a polycrystalline semiconductor.

An amorphous semiconductor can be obtained by glow discharge decomposition of a gas containing silicon. As a typical gas containing silicon, $SiH_4$, and $Si_2H_6$ are given. This gas containing silicon may be diluted with hydrogen or with hydrogen and helium.

Note that a semi-amorphous semiconductor refers to a semiconductor with an intermediate structure between an amorphous semiconductor and a crystalline semiconductor (including a single-crystal semiconductor and a polycrystalline semiconductor). The semi-amorphous semiconductor is a semiconductor having a third condition that is stable in terms of free energy and is a crystal having a short-range order and lattice distortion which can be dispersed in a non-single-crystal semiconductor with its grain diameter of 0.5 to 20 nm. The peak of the Raman spectrum of the semi-amorphous semiconductor shifts to the side of lower wavenumber than 520 $cm^{-1}$. According to X-ray diffraction, diffraction peaks of (111) and (220) which are thought to be attributed to a silicon crystal lattice are observed. In order to terminate a dangling bond, hydrogen or halogen is added by at least 1 atomic % or more. In this specification, such a semiconductor is referred to as a semi-amorphous semiconductor (SAS) for convenience. Moreover, a noble gas element such as helium, argon, krypton, or neon may be contained therein to further promote lattice distortion, so that stability is enhanced and a favorable semi-amorphous semiconductor film can be obtained.

In addition, SAS can be obtained by glow discharge decomposition of a gas containing silicon. As a typical gas containing silicon, $SiH_4$ is given, and $Si_2H_6$, $SiH_2Cl_2$, $SiHCl_3$, $SiCl_4$, $SiF_4$, or the like can be used as well as $SiH_4$. The gas containing silicon may be diluted with hydrogen or with a gas in which one or more of noble gas elements selected from helium, argon, krypton, or neon are added to hydrogen; therefore, the SAS film can be easily formed. It is preferable that the gas containing silicon be diluted with a dilution ratio in the range of from 2 to 1000 times. Further, a carbide gas such as $CH_4$ or $C_2H_6$, a germanium gas such as $GeH_4$ or $GeF_4$, $F_2$, or the like may be mixed into the gas containing silicon so as to adjust the energy bandwidth within the range of from 1.5 to 2.4 eV or from 0.9 to 1.1 eV.

For example, in the case of using a gas in which $H_2$ is added to $SiH_4$ or a gas in which $F_2$ is added to $SiH_4$, the subthreshold coefficient (subthreshold swing) of the TFT can be less than or equal to 0.35 V/dec, typically 0.25 to 0.09 V/dec, and the mobility of carriers can be 10 $cm^2$/Vs when the TFT is manufactured using the formed semi-amorphous semiconductor. When a 19-stage ring oscillator is formed of the TFT using the above-described semi-amorphous semiconductor, for example, the oscillation frequency is greater than or equal to 1 MHz, preferably, greater than or equal to 100 MHz, at a power supply voltage of 3 to 5 V. In addition, at a power supply voltage of 3 to 5 V, delay time per one stage of an inverter can be 26 ns, preferably less than or equal to 0.26 ns.

Figure 5B:
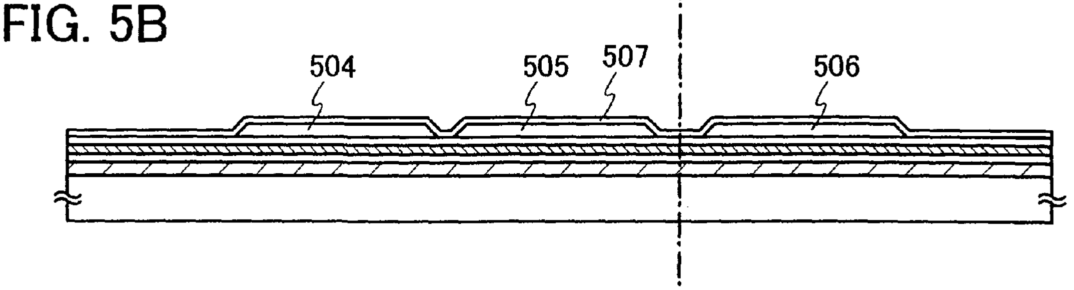

Next, as shown in FIG. 5B, the semiconductor film 503 is patterned to form island-shaped semiconductor films 504 to 506. Then, a gate insulating film 507 is formed to cover the island-shaped semiconductor films 504 to 506. The gate insulating film 507 can be formed by a plasma CVD method, a sputtering method, or the like by using a single layer or stacked layers of a film including silicon nitride, silicon oxide, silicon nitride oxide, or silicon oxynitride. In the case of stacking layers, for example, it is preferable to have a three-layer structure of a silicon oxide film, a silicon nitride film, and a silicon oxide film formed in this order from the substrate side.

Figure 5C:
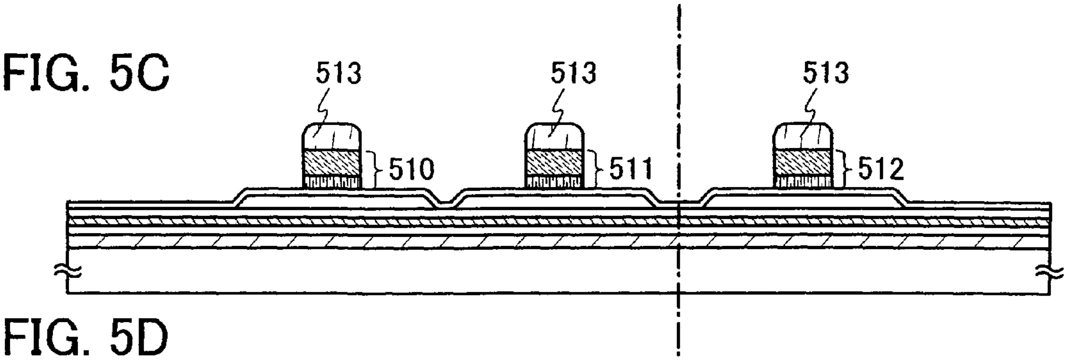

Next, gate electrodes 510 to 512 are formed as shown in FIG. 5C. In this embodiment mode, the gate electrodes 510 to 512 are formed in such a way that silicon doped with an impurity imparting n-type conductivity, tungsten nitride, and tungsten are stacked in this order by a sputtering method and then etching is performed with a resist 513 used as a mask. The material, structure, and manufacturing method of the gate electrodes 510 to 512 are not limited to these and can be selected as appropriate. For example, a stacked-layer structure of silicon doped with an impurity imparting n-type conductivity and nickel silicide, a stacked-layer structure of silicon doped with an impurity imparting n-type conductivity and tungsten silicide, or a stacked-layer structure of tantalum nitride and tungsten may be employed. Alternatively, a single layer of various conductive materials may be used.

The resist mask may be replaced by a mask of silicon oxide or the like. In this case, a step of patterning to form a mask of silicon oxide, silicon oxynitride, or the like (called a hard mask) is added; however, the gate electrodes 510 to 512 can have desired widths because the film thickness of the mask does not decrease at the time of etching compared with the resist. The gate electrodes 510 to 512 may be formed selectively by a droplet discharging method without using the resist 513.

As the conductive material, various materials can be selected depending on the function of a conductive film. When the gate electrodes and the antenna are formed at the same time, the material may be selected in consideration of their functions.

As an etching gas for etching the gate electrodes, a mixed gas of $CF_4$, $Cl_2$, and $O_2$, or a $Cl_2$ gas is employed, though the etching gas is not limited to this.

Figure 5D:
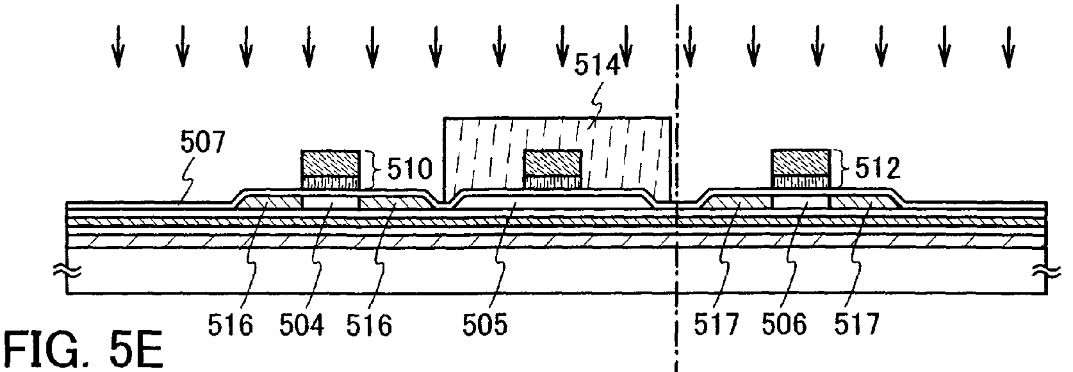

Next, as shown in FIG. 5D, the island-shaped semiconductor film 505 serving as a p-channel TFT is covered with a resist 514, and the island-shaped semiconductor films 504 and 506 are doped with an impurity element imparting n-type conductivity (typically P (phosphorus) or As (arsenic)) at low concentration by using the gate electrodes 510 and 512 as a mask (first doping process). The first doping process is performed under the condition where the dose is in the range of from $1\times10^{13}$ to $6\times10^{13}/cm^2$ and the accelerating voltage is in the range of from 50 to 70 keV; however, the condition is not limited to this. In the first doping process, the doping is performed through the gate insulating film 507, and a pair of low-concentration impurity regions 516 and a pair of low-concentration impurity regions 517 are formed in the island-shaped semiconductor films 504 and 506, respectively. Further, the first doping process may be performed without covering with the resist the island-shaped semiconductor film 505 serving as the p-channel TFT.

Figure 5E:
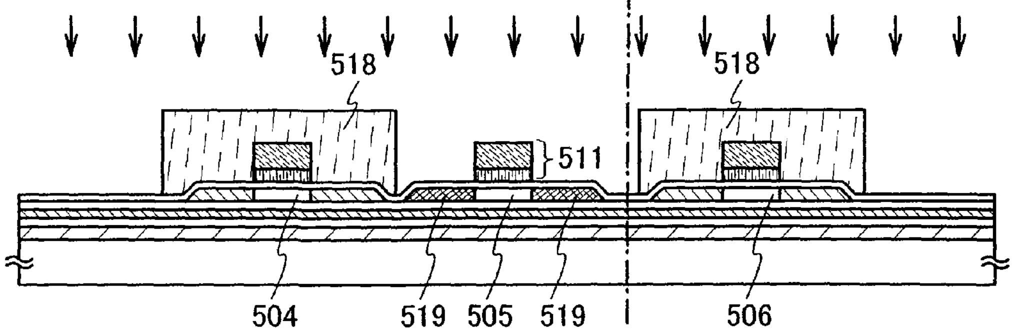

Next, as shown in FIG. 5E, after removing the resist 514 by ashing or the like, a resist 518 is newly formed so as to cover the island-shaped semiconductor films 504 and 506 serving as n-channel TFTs. Then, the island-shaped semiconductor film 505 is doped with an impurity element imparting p-type conductivity (typically B (boron)) at high concentration by using the gate electrode 511 as a mask (second doping process). The second doping process is performed under the condition where the dose is in the range of from $1\times10^{16}$ to $3\times10^{16}/cm^2$ and the accelerating voltage is in the range of from 20 to 40 keV. In the second doping process, the doping is performed through the gate insulating film 507, and a pair of p-type high-concentration impurity regions 519 is formed in the island-shaped semiconductor film 505.

Figure 6A:
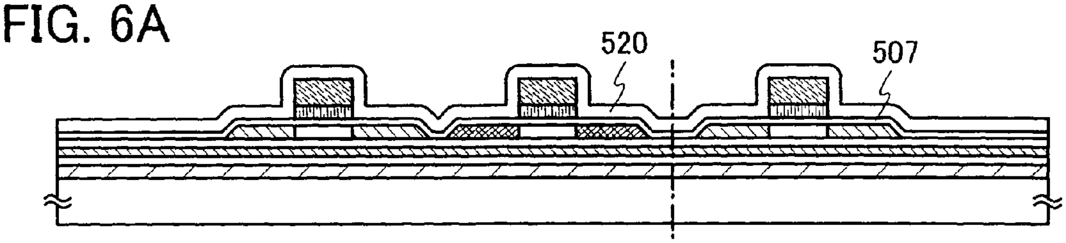
FIGS. 6A to 6E show a manufacturing method of a wireless chip according to Embodiment Mode 3 of the present invention.
Figure 6B:
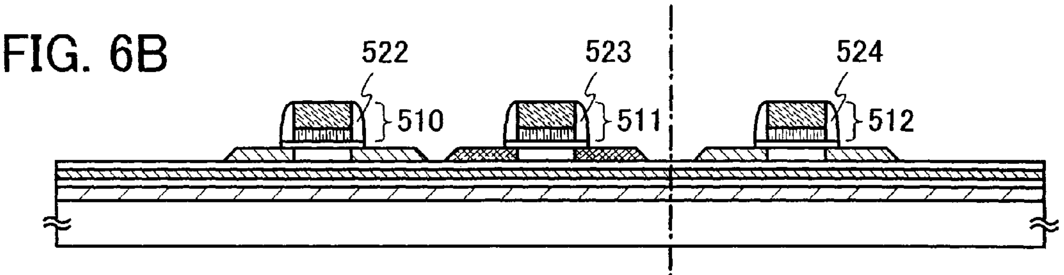

Next, as shown in FIG. 6A, after removing the resist 518 by ashing or the like, an insulating film 520 is formed so as to cover the gate insulating film 507 and the gate electrodes 510 to 512. In this embodiment mode, the insulating film 520 is a 100-nm-thick $SiO_2$ film formed by a plasma CVD method. After that, the insulating film 520 and the gate insulating film 507 are partially etched by an etchback method to form sidewalls 522 to 524 in a self-aligned manner so as to be in contact with sides of the gate electrodes 510 to 512, as shown in FIG. 6B. A mixed gas of $CHF_3$ and He is used as an etching gas. It is to be noted that the step of forming the sidewalls is not limited thereto.

When the insulating film 520 is formed, the insulating film 520 may also be formed at a rear surface of the first substrate 500. In this case, the insulating film formed at the rear surface of the first substrate 500 may be selectively etched away by using a resist. Specifically, the insulating film formed at the rear surface may be etched away together with the insulating film 520 and the gate insulating film 507 at the time of forming the sidewalls 522 to 524 by the etchback method.

The sidewalls 522 and 524 will serve as masks in, subsequently, doping with an impurity imparting n-type conductivity at high concentration to form low-concentration impurity regions or non-doped off-set regions below the sidewalls 522 and 524. Therefore, in order to control the widths of the low-concentration impurity regions or the off-set regions, the size of the sidewalls 522 and 524 may be adjusted by changing, as appropriate, the film thickness of the insulating film 520 or the condition at the etchback method in forming the sidewalls 522 and 524.

Figure 6C:
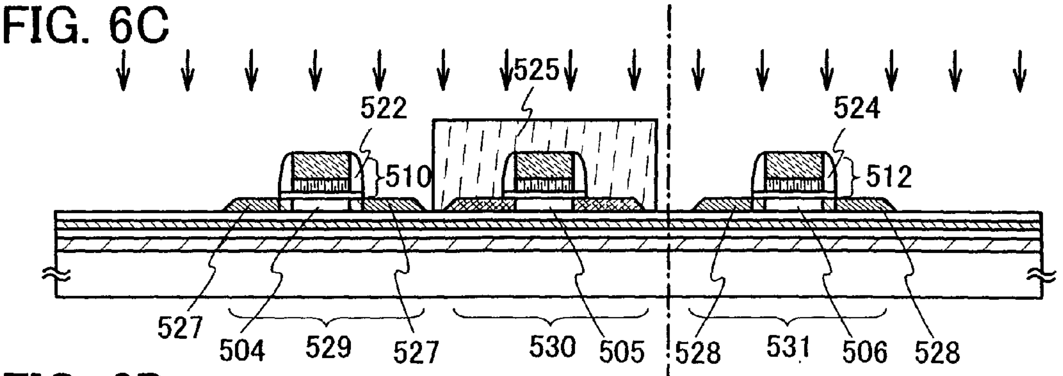

Next, as shown in FIG. 6C, a resist 525 is newly formed so as to cover the island-shaped semiconductor film 505 serving as the p-channel TFT. Then, an impurity element imparting n-type conductivity (typically P or As) is added at high concentration by using the gate electrodes 510 and 512 and the sidewalls 522 and 524 as masks (third doping process). The third doping process is performed under the condition where the dose is in the range of from $1\times10^{13}$ to $5\times10^{15}/cm^2$ and the accelerating voltage is in the range of from 60 to 100 keV. In the third doping process, a pair of n-type high-concentration impurity regions 527 and a pair of n-type high-concentration impurity regions 528 are formed in the island-shaped semiconductor films 504 and 506, respectively.

After removing the resist 525 by ashing or the like, the impurity regions may be thermally activated. For example, after depositing a silicon oxynitride film in 50 nm thick, heat treatment may be performed at 550° C. for 4 hours in a nitrogen atmosphere.

After a silicon nitride film containing hydrogen is formed in 100 nm thick, heat treatment may be performed thereon at 410° C. for 1 hour in a nitrogen atmosphere for hydrogenation of the island-shaped semiconductor films 504 to 506. Alternatively, heat treatment may be performed at 300 to 450° C. for 1 to 12 hours in an atmosphere containing hydrogen for hydrogenation of the island-shaped semiconductor films 504 to 506. Moreover, plasma hydrogenation (using hydrogen excited by plasma) may be performed as another means of hydrogenation. This hydrogenation step can terminate dangling bonds with thermally excited hydrogen. After attaching the semiconductor element onto a second substrate 548 that is flexible in a later process, a defect may be formed in the semiconductor film by bending the second substrate 548. However, even in this case, the defect can be terminated by the hydrogen in the semiconductor film when the concentration of hydrogen in the semiconductor film is set in the range of from $1\times10^{19}$ to $1\times10^{22}$ atoms/$cm^3$, preferably from $1\times10^{19}$ to $5\times10^{20}$ atoms/$cm^3$, by the hydrogenation. Further, in order to terminate the defect, halogen may be included in the semiconductor film.

According to a series of the foregoing steps, an n-channel TFT 529, a p-channel TFT 530, and an n-channel TFT 531 are formed. When the size of the sidewall is adjusted by changing, as appropriate, the condition at the etchback method or the film thickness of the insulating film 520 in the manufacturing steps described above, the TFT can have a channel length of 0.2 to 2 μm. Although the TFTs 529 to 531 each have a top-gate structure in this embodiment mode, they may have a bottom-gate structure (inverted-staggered structure).

After that, a passivation film for protecting the TFTs 529 to 531 may be formed. It is preferable that the passivation film be made of silicon nitride, silicon nitride oxide, aluminum nitride, aluminum oxide, silicon oxide, or the like which can prevent the penetration of alkali metal or alkaline-earth metal into the TFTs 529 to 531. Specifically, for example, a silicon oxynitride film having a thickness of approximately 600 nm can be used as the passivation film. In this case, the hydrogenation step may be performed after forming the silicon oxynitride film. In this manner, three layers of insulating films of silicon oxynitride, silicon nitride, and silicon oxynitride are formed over the TFTs 529 to 531. However, the structures and the materials of these films are not limited thereto. With the above structure, since the TFTs 529 to 531 are covered with the base film 502 and the passivation film, it is possible to prevent alkali metal such as Na or alkaline-earth metal from diffusing into the semiconductor film used for the semiconductor element, thereby preventing an adverse effect on characteristics of the semiconductor element.

Figure 6D:
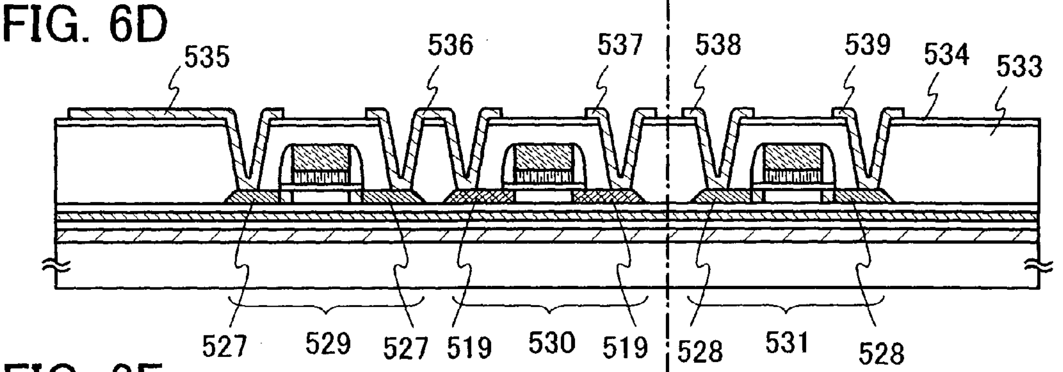

Next, as shown in FIG. 6D, a first interlayer insulating film 533 is formed so as to cover the TFTs 529 to 531. The first interlayer insulating film 533 can be made of a heat-resistant organic resin such as polyimide, acrylic, or polyamide. Instead of those organic resins, a low dielectric constant material (low-k material), a resin including a Si—O—Si bond (hereinafter referred to as a siloxane-based resin), or the like can be used. Siloxane has a skeleton structure of a bond of silicon (Si) and oxygen (O). As a substituent, an organic group containing at least hydrogen (such as an alkyl group or aromatic hydrocarbon) is used. Alternatively, a fluoro group may be used as the substituent. Further alternatively, a fluoro group and an organic group containing at least hydrogen may be used as the substituent. The first interlayer insulating film 533 can be formed by spin coating, dipping, spray coating, a droplet discharging method (an ink jetting method, screen printing, offset printing, or the like), a doctor knife, a roll coater, a curtain coater, a knife coater, or the like, depending on the material thereof. Alternatively, the first interlayer insulating film 533 can be formed using an inorganic material such as silicon oxide, silicon nitride, silicon oxynitride, PSG (phosphosilicate glass), PBSG (phosphoborosilicate glass), BPSG (borophosphosilicate glass), an alumina film, or the like. Insulating films of these may be stacked to form the first interlayer insulating film 533.

Further, a second interlayer insulating film 534 is formed over the first interlayer insulating film 533 in this embodiment mode. The second interlayer insulating film 534 may be a film including carbon such as DLC (diamond-like carbon) or carbon nitride (CN), a silicon oxide film, a silicon nitride film, a silicon nitride oxide film, or the like formed by a plasma CVD method, atmospheric-pressure plasma, or the like. Alternatively, the second interlayer insulating film 534 may be formed of a photosensitive or non-photosensitive organic material such as polyimide, acrylic, polyamide, resist, or benzocyclobutene, a siloxane-based resin, or the like.

A filler may be mixed into the first interlayer insulating film 533 or the second interlayer insulating film 534 in order to prevent the first interlayer insulating film 533 or the second interlayer insulating film 534 from being peeled off or cracked due to stress generated by a difference in coefficient of thermal expansion between the first interlayer insulating film 533 or the second interlayer insulating film 534 and a conductive material of a wiring that is formed later, or the like.

Next, as shown in FIG. 6D, contact holes are formed in the first interlayer insulating film 533 and the second interlayer insulating film 534; then, wirings 535 to 539 are formed so as to be connected to the TFTs 529 to 531. Although a mixed gas of $CHF_3$ and He is used for etching in opening the contact holes, the gas is not limited thereto. In this embodiment mode, the wirings 535 to 539 are formed of aluminum. Alternatively, the wirings 535 to 539 may be formed by a sputtering method so as to have a five-layer structure of titanium, titanium nitride, an alloy of aluminum and silicon, titanium, and titanium nitride.

By mixing about 1 atomic % of silicon into aluminum, it is possible to prevent generation of hillock at the time of baking the resist during patterning of the wirings. Copper may be mixed by approximately 0.5 atomic % instead of silicon. When an aluminum-silicon alloy layer is sandwiched between titanium and titanium nitride, the resistance against the hillock is improved further. It is preferable to use the hard mask described above which is made of silicon oxynitride or the like in patterning. The material and the forming method of the wirings are not limited thereto, and the aforementioned material used for the gate electrode may be used.

The wirings 535 and 536 are connected to the high-concentration impurity regions 527 of the n-channel TFT 529. The wirings 536 and 537 are connected to the high-concentration impurity regions 519 of the p-channel TFT 530. The wirings 538 and 539 are connected to the high-concentration impurity regions 528 of the n-channel TFT 531.

Figure 6E:
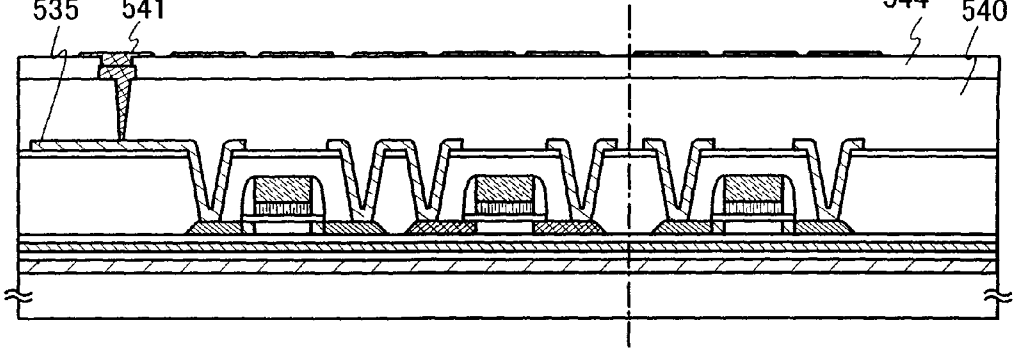

Next, as shown in FIG. 6E, a third interlayer insulating film 540 is formed over the second interlayer insulating film 534 so as to cover the wirings 535 to 539. The third interlayer insulating film 540 has an open portion at a position where the wiring 535 is partially exposed. The third interlayer insulating film 540 can be formed using an organic resin film, an inorganic insulating film, or a siloxane-based insulating film. When an organic resin film is used, for example, acrylic, polyimide, polyamide, or the like can be used. When an inorganic insulating film is used, silicon oxide, silicon nitride oxide, or the like can be used. It is to be noted that a mask used to form the open portion can be formed by a droplet discharging method or a printing method. The third interlayer insulating film 540 itself can be formed by a droplet discharging method or a printing method.

Next, an antenna 541 and an insulating layer 544 are formed over the third interlayer insulating film 540. The antenna 541 can have the same structure as that in the example shown in Embodiment Mode 1, which includes the lower wiring, the barrier layer, the seed layer, and the copper plating layer in this order. In this case, titanium nitride or Ti is used for the barrier layer, and an alloy of Ag, Pd, and Cu is used for the seed layer 107. Since a formation method is the same as that shown in Embodiment Mode 1, description thereof is omitted.

Figure 7A:
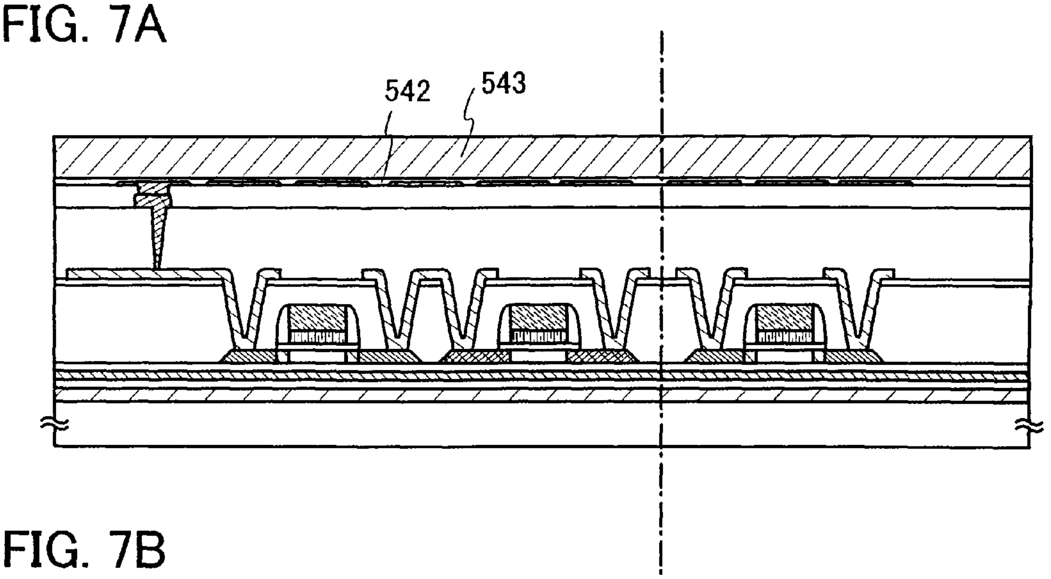
FIGS. 7A to 7C show a manufacturing method of a wireless chip according to Embodiment Mode 3 of the present invention.

After forming the antenna 541 and the insulating layer 544, a separation insulating film 542 is formed to cover the antenna 541 and the insulating layer 544, as shown in FIG. 7A. The separation insulating film 542 can be formed by an organic resin film, an inorganic insulating film, a siloxane-based resin film, or the like. The inorganic insulating film is, for example, a DLC film, a carbon nitride film, a silicon oxide film, a silicon nitride oxide film, a silicon nitride film, an aluminum nitride film, an aluminum nitride oxide film, or the like. Moreover, the separation insulating film 542 may be formed by an organic resin film of polystyrene or the like, a stack of a carbon nitride film and a silicon nitride film, or the like. In this embodiment mode, the separation insulating film 542 is a silicon nitride film.

Next, a protection layer 543 is formed to cover the separation insulating film 542, as shown in FIG. 7A. The protection layer 543 is formed of a material that can protect the TFTs 529 to 531 and the wirings 535 to 539 when the release layer 501 is later etched away. For example, the protection layer 543 can be formed by applying over the entire surface, an epoxy-based resin, an acrylate-based resin, or a silicon-based resin, which is soluble in water or in alcohols.

In this embodiment mode, the protection layer 543 is formed in the following manner: a water-soluble resin (manufactured by Toagosei Co., Ltd.: VL-WSHL10) is applied so as to have a thickness of 30 μm by a spin coating method, and exposed to light for 2 minutes for temporary curing, and then, its rear surface is exposed to UV light for 2.5 minutes and its front surface is exposed to UV light for 10 minutes, 12.5 minutes in total, so that the resin is fully cured. When both the separation insulating film 542 and the protection layer 543 are formed of organic resins, the two films might be partly melted depending on a solvent to be used, at the time of application or baking, resulting in that the adhesion between them becomes too high. Therefore, in the case of forming both the separation insulating film 542 and the protection layer 543 using organic resins that are soluble in the same solvent, it is preferable to further form an inorganic insulating film (a silicon nitride film, a silicon nitride oxide film, an aluminum nitride film, or an aluminum nitride oxide film) over the separation insulating film 542 so as to smoothly remove the protection layer 543 in a later step.

Figure 7B:
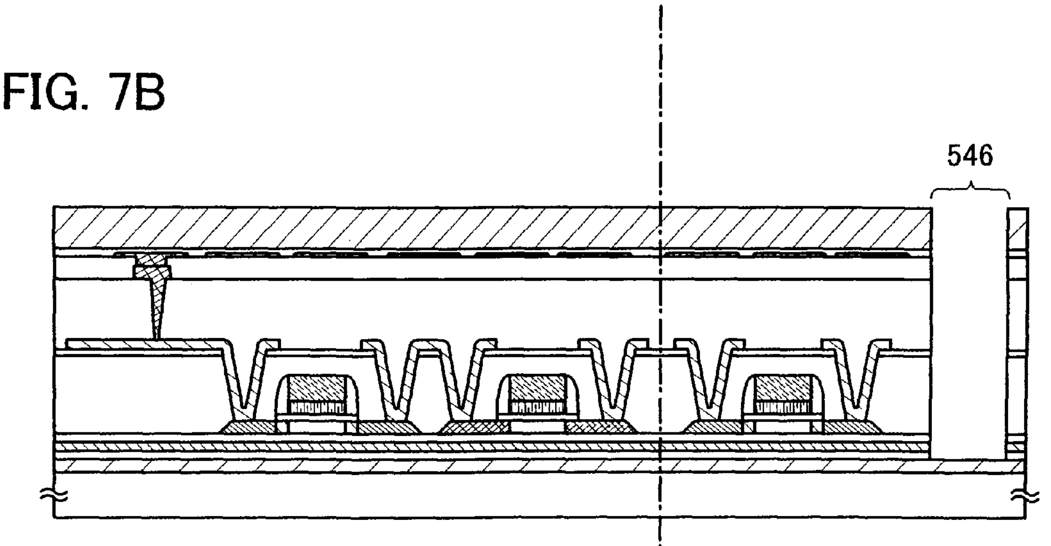

Next, a groove 546 is formed to isolate the wireless chips from each other, as shown in FIG. 7B. The groove 546 may have such depth that the release layer 501 is exposed. The groove 546 can be formed by dicing, scribing, a photolithography method, or the like.

Figure 7C:
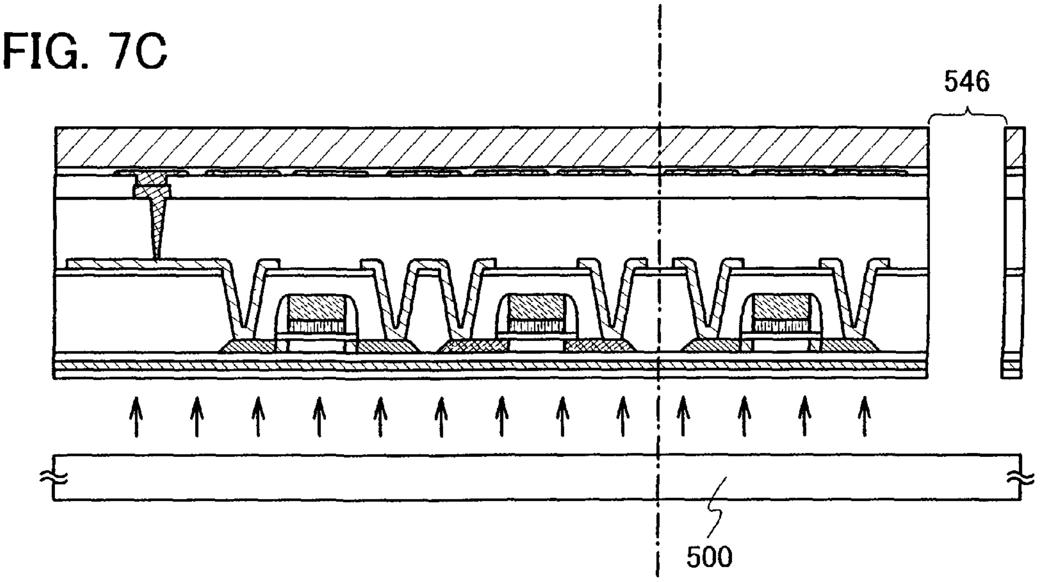

Next, the release layer 501 is etched away, as shown in FIG. 7C. In this embodiment mode, halogen fluoride is used as etching gas, and the gas is introduced through the groove 546. In this embodiment mode, for example, etching is performed by using $ClF_3$ (chlorine trifluoride) at 350° C. at a flow rate of 300 sccm with an atmospheric pressure of $8\times10^2$ Pa (6 Torr) for 3 hours. Alternatively, a gas in which nitrogen is mixed into a $ClF_3$ gas may be used. When halogen fluoride such as $ClF_3$ is used, the release layer 501 is selectively etched, so that the first substrate 500 can be separated from the TFTs 529 to 531. Further, the halogen fluoride may be either a gas or a liquid.

Figure 8A:
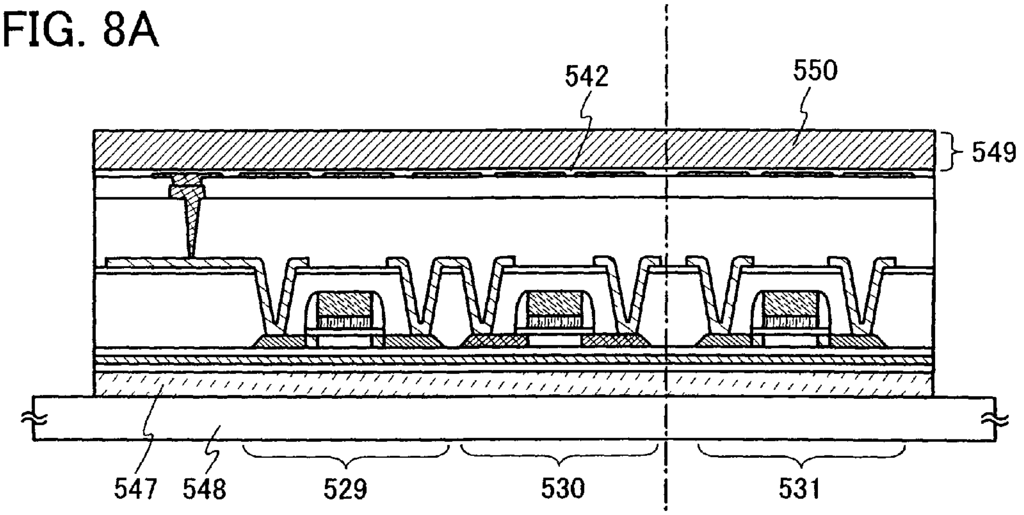
FIGS. 8A and 8B show a manufacturing method of a wireless chip according to Embodiment Mode 3 of the present invention.

Subsequently, as shown in FIG. 8A, the TFTs 529 to 531 that have been separated are attached to the second substrate 548 with the use of an adhesive 547. A material which can attach the second substrate 548 and the base film 502 to each other is used for the adhesive 547. As the adhesive 547, for example, various curable adhesives such as a reactive curable adhesive, a thermosetting adhesive, and a photo curable adhesive such as an ultraviolet curable adhesive, and an anaerobic adhesive can be used.

The second substrate 548 may be, for example, a glass substrate including barium borosilicate glass, aluminoborosilicate glass, or the like, a flexible organic material such as paper or plastic. Alternatively, the second substrate 548 may be formed of a flexible inorganic material. ARTON (manufactured by JSR Corporation) formed of polynorbornene having a polar group can be used for a plastic substrate. In addition, polyester typified by polyethylene terephthalate (PET); polyether sulfone (PES); polyethylene naphthalate (PEN); polycarbonate (PC); nylon; polyetheretherketone (PEEK); polysulfone (PSF); polyetherimide (PEI); polyarylate (PAR); polybutylene terephthalate (PBT); polyimide; an acrylonitrile butadiene styrene resin; polyvinyl chloride; polypropylene; polyvinyl acetate; an acrylic resin; and the like can be given. It is preferable that the second substrate 548 have thermal conductivity as high as 2 to 30 W/mK in order to diffuse heat generated in an integrated circuit.

Then, the protection layer 543 is removed. Here, since the protection layer 543 is formed of a water-soluble resin, the protection layer 543 is removed by being dissolved in water. When the remaining part of the protection layer 543 leads to a defect, a surface of the remaining part of the protection layer 543 is preferably subjected to washing or $O_2$ plasma treatment so that the remaining part of the protection layer 543 is partially removed.

Next, an insulating layer 549 is formed to cover the separation insulating film 542, as shown in FIG. 8A. The insulating layer 549 can be formed of an organic resin such as polyimide, epoxy, acrylic, or polyamide. Instead of the aforementioned organic resins, an inorganic resin such as a siloxane-based material can be used. As a substituent of a siloxane-based material, an organic group containing at least hydrogen (such as an alkyl group or aromatic hydrocarbon) is used. Alternatively, a fluoro group may be used as the substituent. Further alternatively, a fluoro group and an organic group containing at least hydrogen may be used as the substituent.

Next, an adhesive 552 is applied onto the insulating layer 549, and a cover member 553 is attached thereto. The cover member 553 can be formed of a similar material to the second substrate 548. The adhesive 552 may have a thickness of from, for example, 10 to 200 μm.

A material which can attach the cover member 553 and the insulating layer 549 to each other is used for the adhesive 552. As the adhesive 552, for example, various curable adhesives such as a reactive curable adhesive, a thermosetting adhesive, and a photo curable adhesive such as an ultraviolet curable adhesive, and an anaerobic adhesive can be used.

Although the cover member 553 is attached to the insulating layer 549 by using the adhesive 552 in this embodiment mode, the present invention is not limited to this structure. The insulating layer 549 and the cover member 553 can also be attached to each other directly when a resin that functions as an adhesive is used for an insulator 550 of the insulating layer 549.

Figure 8B:
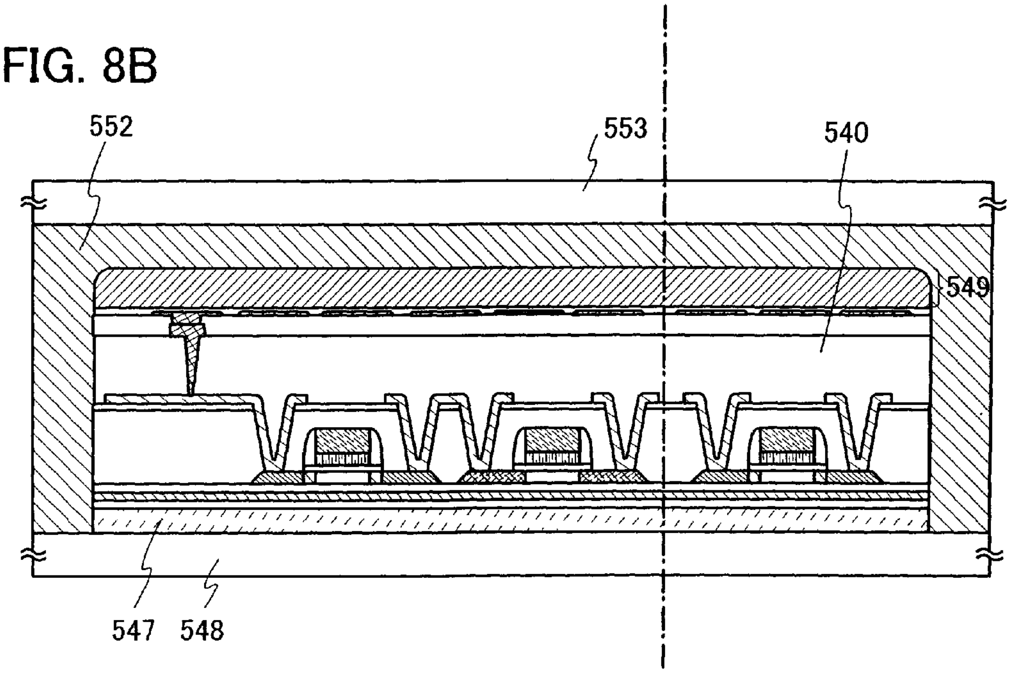

Although this embodiment mode shows the example of using the cover member 553 as shown in FIG. 8B, the present invention is not limited to this structure. For example, the step shown in FIG. 8A may be the last step.

Through the aforementioned steps, the wireless chip is completed. By the above-described manufacturing method, a considerably thin integrated circuit having a total thickness of greater than or equal to 0.3 μm and less than or equal to 3 μm, typically approximately 2 μm, can be formed between the second substrate 548 and the cover member 553. It is to be noted that the thickness of the integrated circuit includes the thicknesses of various insulating films and interlayer insulating films formed between the adhesive 547 and the adhesive 552 in addition to the thickness of the semiconductor element itself, but does not include the thickness of the antenna. In addition, the integrated circuit included in the wireless chip can be formed so as to occupy an area of less than or equal to 5 mm×5 mm (25 $mm^2$), more preferably, approximately 0.3 mm×0.3 mm (0.09 $mm^2$) to 4 mm×4 mm (16 $mm^2$).

Further, when the integrated circuit is provided at a position that is closer to the center between the second substrate 548 and the cover member 553, mechanical strength of the wireless chip can be increased.

In a wireless chip manufactured in the above manner, by using an alloy of Ag, Pd, and Cu for the seed layer, the seed layer has high sulfidation resistance while maintaining low resistance of Ag, has little residue during dry etching, and has strong adhesion to the copper plating layer. Further, by using titanium nitride or Ti for the barrier layer, a copper plating layer with excellent adhesion to the alloy of Ag, Pd, and Cu that does not peel off easily, which also prevents diffusion of copper, such as electromigration or stress migration, can be formed.

Embodiment Mode 4

Embodiment Mode 4 will explain application examples of a semiconductor device of the present invention. The application range of a semiconductor device of the present invention is so wide that it can be applied to any product in order that information of an object such as the history is revealed without contact and utilized in production, management, and the like. For example, a semiconductor device of the present invention may be incorporated in bills, coins, securities, certificates, bearer bonds, containers for packaging, books, recording media, personal belongings, vehicles, foods, clothes, healthcare items, livingware, medicals, electronic appliances, and the like. These examples are explained with reference to FIGS. 9A to 9H.

Figure 9A:
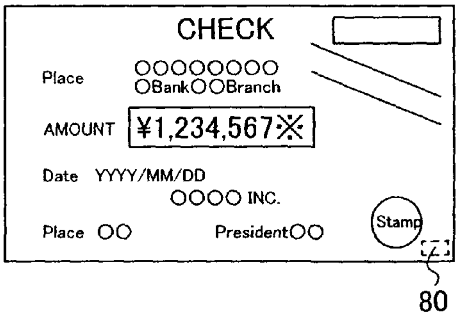
FIGS. 9A to 9H each show an electronic appliance according to Embodiment Mode 4 of the present invention.
Figure 9B:
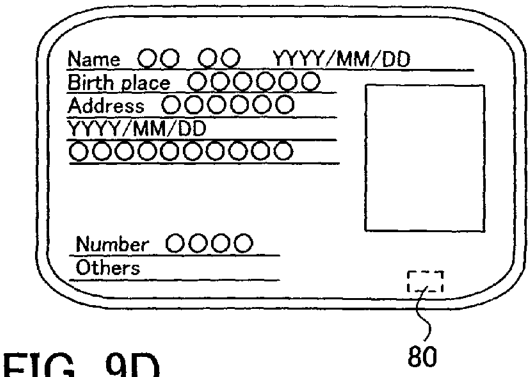
Figure 9C:
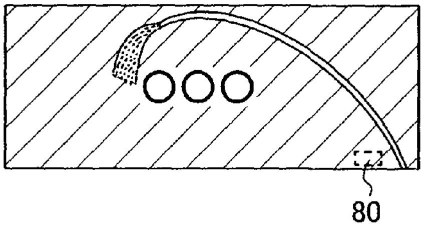
Figure 9D:
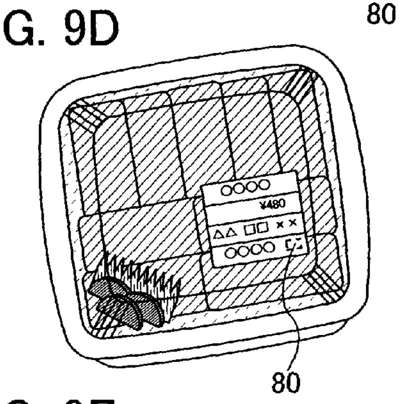
Figure 9E:
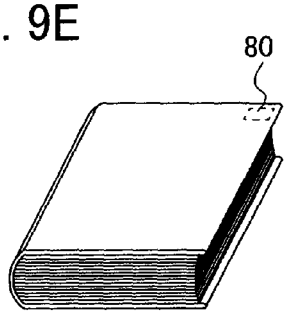
Figure 9F:
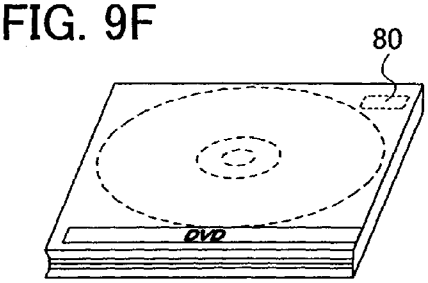
Figure 9G:
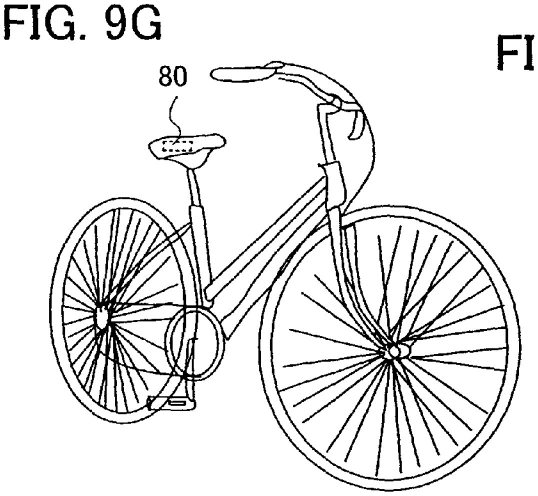
Figure 9H:
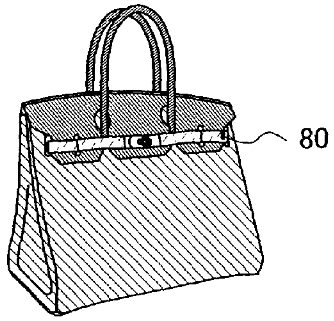

The bills and coins correspond to currency circulating in the market and include notes that are current as money in a specific area (cash voucher), memorial coins, and the like. The securities include a check, a certificate, a promissory note, and the like (FIG. 9A). The certificates include a driver's license, a resident card, and the like (FIG. 9B). The bearer bonds include a stamp, a rice coupon, various gift coupons, and the like (FIG. 9C). The containers for packaging include paper for wrapping a box lunch or the like, a plastic bottle, and the like (FIG. 9D). The books include a document and the like (FIG. 9E). The recording media include DVD software, a video tape, and the like (FIG. 9F). The vehicles include a wheeled vehicle such as a bicycle, a vessel, and the like (FIG. 9G). The personal belongings include a bag, glasses, and the like (FIG. 9H). The foods include food items, beverages, and the like. The clothes include clothing, footwear, and the like. The healthcare items include a medical device, a health appliance, and the like. The livingware includes furniture, a lighting apparatus, and the like. The medicals include a medicine, an agricultural chemical, and the like. The electronic appliance refers to a liquid crystal display device, an EL display device, a television set (a TV receiver or a thin TV receiver), a mobile phone, or the like.

When a semiconductor device 80 of the present invention is incorporated in bank notes, coins, securities, bearer bonds, certificates, and the like, forgery can be prevented. When the semiconductor device 80 is incorporated in containers for packaging, books, recording media, personal belongings, foods, livingware, electronic appliances, and the like, the efficiency of an inspection system, a system used in a rental shop, or the like can be improved. When the semiconductor device 80 is incorporated in vehicles, healthcare items, medicals, and the like, forgery and theft of them can be prevented and medicines can be prevented from being taken in a wrong manner. The semiconductor device 80 may be attached to a surface of a product or incorporated into a product. Further, the semiconductor device 80 may be incorporated into paper of a book, or an organic resin of a package, for example.

In addition, when a semiconductor device is implanted into creatures such as animals, each creature can be identified easily. For example, when a semiconductor device provided with a sensor is implanted into creatures such as domestic animals, not only information such as the year of birth, sex, and breed, but also health conditions such as body temperature can be easily managed. In particular, in the semiconductor device shown in the above embodiment modes, an alloy of Ag, Pd, and Cu is used for the seed layer and adhesion thereof to the copper plating layer is strong; therefore, it is possible to prevent a defect of the semiconductor device due to poor connection between the antenna and the integrated circuit even when the semiconductor device is provided to a curved surface or the product is bent.

The semiconductor device shown in this embodiment mode can be applied to the semiconductor device in any of the other embodiment modes described in this specification.

This application is based on Japanese Patent Application serial No. 2007-154824 filed with Japan Patent Office on Jun. 12, 2007, the entire contents of which are hereby incorporated by reference.

What is claimed is:

1. A semiconductor device comprising:
an antenna; and
an integrated circuit electrically connected to the antenna, the integrated circuit comprising a semiconductor element,
wherein the antenna comprises:
a first layer including titanium nitride;
a second layer over and in contact with the first layer, the second layer including an alloy, wherein the alloy comprises silver, copper, and palladium; and
a third layer over and in contact with the second layer, the third layer including copper.

2. The semiconductor device according to claim 1, wherein a lower wiring is provided under the first layer.

3. The semiconductor device according to claim 1, wherein the first layer and the second layer are formed by a sputtering method.

4. The semiconductor device according to claim 1, wherein a planar shape of the antenna has a rectangular and spiral shape.

5. The semiconductor device according to claim 1,
wherein the antenna and the integrated circuit are formed over a substrate, and
wherein the substrate over which the antenna and the integrated circuit are formed is one of a glass substrate and a plastic substrate.

6. The semiconductor device according to claim 1, further comprising a substrate under the antenna and the integrated circuit,
wherein the integrated circuit comprises a thin film transistor.

7. The semiconductor device according to claim 1,
wherein the first layer is a barrier layer,
wherein the second layer is a seed layer, and
wherein the third layer is a copper plating layer.

8. A semiconductor device comprising:
an antenna; and
an integrated circuit electrically connected to the antenna, the integrated circuit comprising a semiconductor element,
wherein the antenna comprises:
a first layer including titanium;
a second layer over and in contact with the first layer, the second layer including an alloy, wherein the alloy comprises silver, copper, and palladium; and
a third layer over and in contact with the second layer, the third layer including copper.

9. The semiconductor device according to claim 8, wherein a lower wiring is provided under the first layer.

10. The semiconductor device according to claim 8, wherein the first layer and the second layer are formed by a sputtering method.

11. The semiconductor device according to claim 8, wherein a planar shape of the antenna has a rectangular and spiral shape.

12. The semiconductor device according to claim 8,
wherein the antenna and the integrated circuit are formed over a substrate, and
wherein the substrate over which the antenna and the integrated circuit are formed is one of a glass substrate and a plastic substrate.

13. The semiconductor device according to claim 8, further comprising a substrate under the antenna and the integrated circuit,
wherein the integrated circuit comprises a thin film transistor.

14. The semiconductor device according to claim 8,
wherein the first layer is a barrier layer,
wherein the second layer is a seed layer, and
wherein the third layer is a copper plating layer.

15. A semiconductor device comprising:
a transistor;
a wiring over the transistor, the wiring being electrically connected to the transistor;

an insulating layer over the wiring; and
an antenna over the insulating layer, the antenna being electrically connected to the wiring;
wherein the antenna comprises:
a first layer including titanium nitride;
a second layer over and in contact with the first layer, the second layer including an alloy, wherein the alloy comprises silver, copper, and palladium; and
a third layer over and in contact with the second layer, the third layer including copper.

16. The semiconductor device according to claim 15, wherein the wiring is provided under the first layer.

17. The semiconductor device according to claim 15, wherein the first layer and the second layer are formed by a sputtering method.

18. The semiconductor device according to claim 15, wherein a planar shape of the antenna has a rectangular and spiral shape.

19. The semiconductor device according to claim 15,
wherein the transistor is formed over a substrate, and
wherein the substrate is one of a glass substrate and a plastic substrate.

20. The semiconductor device according to claim 15, wherein the wiring is in contact with the first layer at a contact hole of the insulating layer.

21. The semiconductor device according to claim 15,
wherein the transistor is formed over a substrate, and
wherein the substrate is attached to the transistor with an adhesive interposed therebetween.

22. The semiconductor device according to claim 15, wherein the wiring is a aluminum film having 99.9% purity.

23. The semiconductor device according to claim 15, wherein the insulating layer includes soft magnetic material.

24. The semiconductor device according to claim 15, further comprising a silicon nitride film including hydrogen over the transistor.

25. The semiconductor device according to claim 15, wherein the wiring includes a five layer structure of a titanium layer, a titanium nitride layer, an alloy layer of aluminum and silicon, a titanium layer, and a titanium nitride layer.

26. The semiconductor device according to claim 15, further comprising a substrate under the transistor,
wherein the transistor is a thin film transistor.

27. The semiconductor device according to claim 15,
wherein the first layer is a barrier layer,
wherein the second layer is a seed layer, and
wherein the third layer is a copper plating layer.

28. A semiconductor device comprising:
a transistor;
a wiring over the transistor, the wiring being electrically connected to the transistor;
an insulating layer over the wiring; and
an antenna over the insulating layer, the antenna being electrically connected to the wiring;
wherein the antenna comprises:
a first layer including titanium;
a second layer over and in contact with the first layer, the second layer including an alloy, wherein the alloy comprises silver, copper, and palladium; and
a third layer over and in contact with the second layer, the third layer including copper.

29. The semiconductor device according to claim 28, wherein the wiring is provided under the first layer.

30. The semiconductor device according to claim 28, wherein the first layer and the second layer are formed by a sputtering method.

31. The semiconductor device according to claim 28, wherein a planar shape of the antenna has a rectangular and spiral shape.

32. The semiconductor device according to claim 28,
wherein the transistor is formed over a substrate, and
wherein the substrate is one of a glass substrate and a plastic substrate.

33. The semiconductor device according to claim 28, further comprising a substrate under the transistor,
wherein the transistor is a thin film transistor.

34. The semiconductor device according to claim 28,
wherein the first layer is a barrier layer,
wherein the second layer is a seed layer, and
wherein the third layer is a copper plating layer.

* * * * *